US010652796B2

(12) United States Patent
Laliberte

(10) Patent No.: US 10,652,796 B2
(45) Date of Patent: May 12, 2020

(54) DATA NETWORK ACCESS SELECTION, MIGRATION AND QUALITY MANAGEMENT SYSTEMS AND METHODS

(71) Applicant: Investel Capital Corporation, Vancouver (CA)

(72) Inventor: Benoit Laliberte, Mont St-Hilaire (CA)

(73) Assignee: Investel Capital Corporation, Vancouver (CA)

( * ) Notice: Subject to any disclaimer, the term of this patent is extended or adjusted under 35 U.S.C. 154(b) by 0 days.

(21) Appl. No.: 15/772,256

(22) PCT Filed: Oct. 31, 2016

(86) PCT No.: PCT/CA2016/051262
§ 371 (c)(1),
(2) Date: Apr. 30, 2018

(87) PCT Pub. No.: WO2017/070797
PCT Pub. Date: May 4, 2017

(65) Prior Publication Data
US 2019/0182734 A1    Jun. 13, 2019

(30) Foreign Application Priority Data

Oct. 30, 2015    (CA) ..................................... 2910520
Oct. 30, 2015    (CA) ..................................... 2910654
Oct. 30, 2015    (WO) ................ PCT/CA2015/051119

(51) Int. Cl.
*H04W 36/14*    (2009.01)
*H04W 36/32*    (2009.01)
*H04W 80/08*    (2009.01)
*H04W 24/08*    (2009.01)
*H04L 29/06*    (2006.01)
*H04W 36/00*    (2009.01)
*H04W 76/10*    (2018.01)
*H04W 80/10*    (2009.01)

(52) U.S. Cl.
CPC ............. *H04W 36/14* (2013.01); *H04L 65/10* (2013.01); *H04L 65/105* (2013.01); *H04L 65/1073* (2013.01); *H04W 24/08* (2013.01); *H04W 36/0027* (2013.01); *H04W 36/32* (2013.01); *H04W 80/08* (2013.01); *H04W 76/10* (2018.02); *H04W 80/10* (2013.01)

(58) Field of Classification Search
CPC . H04W 36/14; H04W 24/08; H04W 36/0027; H04W 36/32; H04W 80/08; H04W 76/10; H04W 80/10; H04L 65/10; H04L 65/105; H04L 65/1073
See application file for complete search history.

(56) References Cited

U.S. PATENT DOCUMENTS

2009/0285175 A1* 11/2009 Nix ........................ H04L 29/125
370/331
2017/0325141 A1* 11/2017 Laliberte ............... H04W 12/06

* cited by examiner

*Primary Examiner* — Melvin C Marcelo
(74) *Attorney, Agent, or Firm* — Price Heneveld LLP

(57) ABSTRACT

Described are various embodiments of a data network subscriber access, migration and quality management system and method. Some embodiments provide a system and method for maintaining a call between a calling device and a recipient device as the calling device migrates between distinct data networks. Other embodiments provide a system for modulating available data communication bandwidth to a plurality of fixed data network addresses.

20 Claims, 20 Drawing Sheets

| iPCS Service | $0 | $9 | $19 | $29 | $39 | $49 |
|---|---|---|---|---|---|---|
| MB | *Current provider data plan | 125 | 300 | 500 | 650 | 850 |
| Voice Minutes | * | 1,000 | 2,400 | 4,000 | 5,200 | 6,800 |
| Data / Internet (pages) | * | 500 | 1,200 | 2,000 | 2,600 | 3,400 |
| Text North America | * | 10,000 | 24,000 | 40,000 | 52,000 | 68,000 |
| Text Global | * | 5,000 | 12,000 | 20,000 | 26,000 | 34,000 |
| Text Picture Message | * | 250 | 600 | 1,000 | 1,300 | 1,700 |
| Or any combination | 9 minutes talk = 1 MB • 90 text messages = 1MB • 4 Web pages = 1 MB ||||||

FIGURE 11

| | | | | | | |
|---|---|---|---|---|---|---|
| Canadian National Coverage | See your provider | ✔ | ✔ | ✔ | ✔ | ✔ |
| Your phone number anywhere in Canada or any of 50 countries | ✔ | ✔ | ✔ | ✔ | ✔ | ✔ |
| Voicemail (enhanced) | ✔ | ✔ | ✔ | ✔ | ✔ | ✔ |
| CallerID/Call Waiting & Forwarding, 3-way | ✔ | ✔ | ✔ | ✔ | ✔ | ✔ |
| Canada Long Distance | Unlimited | Unlimited | Unlimited | Unlimited | Unlimited | Unlimited |
| US Long Distance | No | Unlimited | Unlimited | Unlimited | Unlimited | Unlimited |
| Secure Communications | No | No | No | No | No | ✔ |
| E-911 Enhanced Can & USA | ✔ | ✔ | ✔ | ✔ | ✔ | ✔ |
| Push2Talk / 2way Com/ Paging/ Track | ✔ | ✔ | ✔ | ✔ | ✔ | ✔ |

FIGURE 12

DATA NETWORK ACCESS SELECTION, MIGRATION AND QUALITY MANAGEMENT SYSTEMS AND METHODS

FIELD OF THE DISCLOSURE

The present disclosure relates to data communications, and in particular, to a data network access selection, migration and quality management systems and methods.

BACKGROUND

Various wireless communication devices and platforms are available today to allow users of such devices to access different at-times interrelated communication networks to wirelessly exchange voice and data communications over such networks. Common wireless data communication networks may include, but are not limited to, various cellular and Wi-Fi network technologies, which will be readily known by the skilled artisan. Upon connection to one of these networks, a mobile device will be assigned a network address or number and provided with various means to exchange voice and/or data over such network connection using this assigned network address or number. For example, mobile devices may exchange voice and text-based (e.g. SMS) communications over standard mobile telephony network, and/or exchange various data communications such e-mail, text messaging, multimedia messaging, and voice-over-data communications over standard mobile data network platforms. Likewise, a mobile device may be configured to exchange data communications over a wireless data network such as a home or public Wi-Fi connection to an ISP and thus circumvent higher costs generally associated with mobile data communications.

As a mobile device migrates from one cell to another in a same cellular network, voice and data communications may be handed over from one cell to the other in providing more or less continuous service to the mobile user. Generally, the mobile device will continuously probe reception quality from two or more base stations and, upon identifying that a better quality signal may be available from a new base station, the mobile device will negotiate with the new base station to have ongoing mobile communications handed over thereto from a current base station. As both base stations form part of the same mobile communication network, mobile communications can be more or less seamlessly transferred between a given mobile operator's various base stations as the mobile device changes location within the mobile operator's network. Likewise, a VoIP call can be maintained on a mobile device as the device is moved across a Wireless Local-Area Network (WLAN) or the like in which each wireless router shares a same Service Set Identifier (SSID), for example.

For most mobile data exchanges, such as text-based or multimedia messaging, emails, and Web browsing, a mobile device can also be configured to automatically switch between data networks with little to no service interruption. For example, a mobile device that is actively used to browse the Web or exchange emails over a mobile data network may automatically identify and connect to an available Wi-Fi connection and seamlessly transfer execution of data transactions from the mobile data network to the Wi-Fi data network, in some configurations, even within the context of an ongoing session. Given standard protocols used in such data transactions, such a TCP/IP, any lost or undelivered data package during the transition will be resent or otherwise addressed in subsequent communications with the mobile device's new IP address (e.g. Wi-Fi Access Point IP Address).

Unfortunately, seamless voice data migrations from one mobile operator's network to another data network are not so readily achievable. Namely, as voice data communications are generally established through a series of standard call setup procedures (e.g. call signaling and media initialization protocols), an established voice data call cannot readily be switched from one data network to another without call re-initialization.

For example, a VoIP (Voice over Internet Protocol) call is generally setup via a signaling protocol (e.g. SIP, H.323, SCCP, etc.), which is followed by a media (i.e. audio) setup for the call that is generally is negotiated via SDP (Session Description Protocol) to describe media initialization parameters. The SDP is used to describe the capacity of each call end point, namely the codec(s) each end can support and to which IP address and port inbound media is to be sent to. Accordingly, each call party exchanges SDP information at the beginning of the call and agrees on the codec and the respective IP addresses to be used during for the call. In some instances, new SDP information must be sent at the establishment of a call to accommodate an end point that may not be configured to support a specific codec and where transcoding is therefore necessary to establish communications between the two call parties. This is typically called a Re-Invite where both ends agree to a new SDP. However, if one of the IP addresses negotiated via the original SDP changes to a new IP address during an established call, the connection will be invariably lost as the other party's device will have no means to identify and readdress outbound communications to this new IP address. Accordingly, a new SDP must be invoked if media (e.g. Real Time Protocol or RTP media) is to be exchanged with a new IP address. In the context of a VoIP application running on a smartphone device or the like, the user must either complete an ongoing VoIP call over the originating network on which the call was initialized and established, or reinitialize the call upon accessing a new data network (e.g. when wishing to switch from a mobile data network to a local Wi-Fi network).

Mobile communications such as mobile voice-over-data exchanges can also be subject to variations in call quality due to various parameters, such as signal strength, data packet latency, speed, losses and variable rates resulting in oft times imperceptible, but occasionally significantly disruptive call quality degradation. While traditional mobile devices are provided with a signal strength indicator to reflect a signal strength from a nearest mobile network transmitter, little detail is made available to the user of such mobile device, and even less so to the mobile operator, as to actual call quality at either end of a mobile-initiated and/or terminated voice data call. Furthermore, perturbations in call quality during an ongoing call can generally frustrate participating parties who are left to question the source of the call quality degradations, and even wonder whether a call remains in effect or has been entirely dropped, and when.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for data network access selection, migration and quality management systems and methods that overcome some of the drawbacks of known systems, or at least, provides a useful alternative thereto.

A further or alternative need exists for a system and method for migrating a voice over data call between distinct data networks, and a voice over data call intermediating system and method therefor, that overcome some of the drawbacks of known systems, or at least, provides a useful alternative thereto.

A further or alternative need also exists for a mobile data network connection quality monitoring system and method, and mobile client application and operator network configuration therefor, that overcome some of the drawbacks of known systems, or at least, provides a useful alternative thereto.

A further or alternative need exists for a method for automatically migrating wireless data network communications between data networks, that overcome some of the drawbacks of known systems, or at least, provides a useful alternative thereto.

Some aspects of this disclosure provide examples of such systems and methods, in accordance with different embodiments of the invention.

In accordance with one broad aspect, there is provided a method for maintaining a call between a calling device and a recipient device as the calling device migrates between distinct data networks, the method comprising: receiving a call initialization request at a data server from an originating data network address on an originating data network accessible to the calling device, wherein said call initialization request comprises a call recipient identifier; intermediating initialization of the call with the recipient device over a recipient network using said call recipient identifier to establish the call between the calling device and the recipient device; relaying outbound voice communications from, and inbound voice communications to, said originating data network address over said originating data network once the call has been established; receiving a new outbound communication initiated by the calling device from a new data network connection having a new data network address; automatically associating said new data network address with the call; and relaying subsequent outbound voice communications from, and subsequent inbound voice communications to, said new data address to maintain the call without re-initializing the call connection with the calling device.

In accordance with another broad aspect, there is provided a method for maintaining a call between a calling device and a recipient device as the recipient device migrates between distinct data networks, the method comprising: receiving a call initialization request at a data server from the calling device, wherein said call initialization request comprises a call recipient identifier; intermediating initialization of the call with the recipient device over an originating recipient data network using said call recipient identifier to establish the call between the calling device and the recipient device; relaying outbound voice communications from, and inbound voice communications to an originating data network address associated with the recipient device once the call has been established; receiving a new outbound communication initiated by the recipient device from a new data network connection having a new data network address; automatically associating said new data network address with the call; and relaying subsequent outbound voice communications from, and subsequent inbound voice communications to, said new data address to maintain the call without re-initializing a call connection with the recipient device.

In accordance with another broad aspect, there is provided a voice-over data call intermediation system comprising: a network-accessible voice-over-data server operable to: receive a call initialization request from an originating data network address on an originating data network accessible to a given calling device, wherein said call initialization request comprises a call recipient identifier; intermediate initialization of a call with a recipient device over a recipient network using said call recipient identifier to establish a call between said calling device and said recipient device; relay outbound voice communications from, and inbound voice communications to, said originating data network address over said originating data network once said call has been established; automatically identify a new outbound communication initiated by said calling device from a new data network connection having a new data network address as originating from said calling device as part of said call established with said recipient device; and relay subsequent outbound voice communications from, and subsequent inbound voice communications to, said new data address to maintain said call without re-initializing a call connection with said calling device.

In accordance with another broad aspect, there is provided a voice-over-data call intermediation system comprising: a network-accessible voice-over-data server operable to: receive a call initialization request from a calling device over a recipient network, wherein said call initialization request comprises a call recipient identifier; intermediate initialization of a call with a recipient device over an originating data network using said call recipient identifier to establish a call between said calling device and said recipient device; relay outbound voice communications from, and inbound voice communications to, an originating data network address associated with said recipient device over said originating data network once said call has been established; automatically identify a new outbound communication initiated by said recipient device from a new data network connection having a new data network address as originating from said recipient device as part of said call established with said calling device; and relay subsequent outbound voice communications from, and subsequent inbound voice communications to, said new data address to maintain said call without re-initializing a call connection with said recipient device.

In accordance with another broad aspect, there is provided a method for migrating a call over SIP as a migrating call party device migrates to a new data network connection, the method comprising: intermediating establishment of the call via respective caller and recipient data network addresses; receiving a new SIP client registration request from the migrating call party device as it migrates to the new data network connection, said new SIP client registration request identifying a new data network address associated with the new data network connection; and automatically defining a SIP return path for said migrating call party device as said new data network address based on said new SIP client registration request.

In accordance with another broad aspect, there is provided a method for providing real-time mobile voice data call quality management for a call established over a data network with a mobile device, the method comprising: establishing a data network connection between a mobile client application operating on the mobile device and a data network-accessible server; establishing a mobile voice data call with said client application via said server to relay outbound voice data communications from, and inbound voice data communications to said mobile client application via said server during the mobile voice data call; monitoring in real-time at said server at least one voice data packet communication quality metric during the call; and relaying to said mobile client application via a call quality management data path at least one of said at least one voice data packet communication quality metric or an indication thereof, for processing by said client application.

In accordance with another broad aspect, there is provided a voice-over-data system for providing real-time mobile voice data call quality management for a voice-over-data call established over a data network with a mobile device, the system comprising: a data-network-accessible server for intermediating the voice-over-data call; a client application operating on the mobile device and operable to establish the voice-over-data call via said server; wherein said server is operable to: relay outbound voice data communications from, and inbound voice data communications to said mobile client application during the call; monitor in real-time at least one voice data packet communication quality metric during the call; and relay to said mobile client application via a call quality management data path at least one of said at least one voice data packet communication quality metric or an indication thereof, for processing by said client application.

In accordance with another broad aspect, there is provided a method for migrating mobile services on a mobile device, comprising: providing a virtualized smartphone application to be installed on the mobile device; enabling execution of said application on the mobile device to automatically extract from the mobile device all mobile device data necessary to unlock the mobile device and relay said mobile device data to a network-accessible smartphone-over-data service server; processing said mobile device data at said server to establish an unlock code for the mobile device based on said mobile device data; communicating said unlock code to the mobile device from said server with instructions to input said unlock code into the mobile device; providing a user-agnostic SIM card to be installed in the mobile device once unlocked to direct all data network traffic to said server; and initializing mobile data services on the mobile device via said virtualized smartphone-over-data application over a data network connection to said server.

In accordance with another broad aspect, there is provided a system for modulating available data communication bandwidth to a plurality of fixed data network addresses, the system comprising: a digital data storage device having stored in association therewith a digital user identifier associated each of a plurality of registered data network users; and a network-accessible controller having operative access to said digital data storage device and operable to receive data communications from a given electronic device operated to communicate data via a given local network connection through a given fixed data network address, wherein said controller is operable to automatically recognize a given user identifier associated with said data communications as corresponding to one of said registered users, and automatically responsively increase an available data communication bandwidth associated with said given fixed data network address.

In accordance with one embodiment, the data communications are at least in part associated with establishment of said given local network connection by said given electronic device, and wherein said increase in said available data communication bandwidth is associated with said given local connection establishment.

In accordance with one embodiment, the increase in said available data communication bandwidth is automatically terminated upon termination of said given local connection.

In accordance with one embodiment, each of said registered users is associated in said digital storage device with at least one of said fixed data network addresses; and wherein said controller is further operable to only provide said increase in said available data communication bandwidth upon said given user identifier being associated with said given fixed data network address in said digital data storage device.

In accordance with one embodiment, said controller is operable to relay mobile data communications associated with said given user identifier to and from said electronic device over a mobile network at least in part based on said given user identifier, and wherein said establishment is automatically implemented in migrating said mobile data communications to said given local connection in circumventing said mobile network.

In accordance with one embodiment, the system further comprises a client application executable on said given electronic device and configured to relay both fixed and mobile data communications from said electronic device via said controller or a data server operatively associated therewith.

In accordance with one embodiment, said controller is operable to receive distinct data communications from distinct electronic devices operated to communicate via distinct local network connections to said given fixed data network address, wherein said controller is operable to automatically recognize distinct user identifiers associated with said distinct data communications as corresponding to respective others of said registered users, and automatically responsively increment said available data communication bandwidth associated with said given fixed data network address based on a number of said respective others of said registered users so recognized.

In accordance with one embodiment, the system further comprises a client application executable on said given electronic device and configured to relay all data communications from said electronic device via said controller.

In accordance with one embodiment, said client application is only operable subsequent to authentication of said given user identifier via said controller such that all data communications relayed from and to said electronic device in respect of said client application are relayed in respect of said given user identifier post-authentication.

In accordance with one embodiment, said client application is a cloud-based softphone application.

In accordance with one embodiment, said increase in said available data communication bandwidth is made indiscriminately available through all active local data connections to said given fixed data network address.

In accordance with one embodiment, said local connection is a Wi-Fi connection.

In accordance with one embodiment, said fixed network address is associated with a residential or commercial data network access connection.

In accordance with one embodiment, said available data communication bandwidth at said given fixed data network address in absence of a registered user connection is automatically set to a designated basic bandwidth available to non-registered users.

In accordance with another broad aspect, there is provided an automated computer-implemented method for modulating an available data communication bandwidth for each of a plurality of fixed data network addresses in a fixed data network, the method comprising: maintaining a data store of registered user identifiers; automatically recognizing, via a network-accessible controller operatively linked to said data store, association of a given registered user identifier with establishment of a local data connection from an electronic device via a given fixed data network address; and responsively, automatically increasing an available data communication bandwidth associated with said given fixed data network address until termination of said local data connection.

In accordance with one embodiment, the method further comprises: maintaining in said data store respective associations between said registered user identifiers and said fixed data network addresses; automatically cross-referencing said given registered user identifier with given data network address in said data store; and exclusively increasing said available data communication bandwidth associated with said given fixed data network address upon said given registered user identifier being previously associated in said data store with said given fixed data network address, as automatically determined by said cross-referencing.

In accordance with one embodiment, the method further comprises: prior to said establishment, relaying via said controller mobile data communications associated with said given user identifier to and from said electronic device over a mobile network; wherein said establishment is automatically initiated by said electronic device in migrating said mobile data communications to said given local connection in circumventing said mobile network.

In accordance with one embodiment, both fixed and mobile data communications are relayed from said electronic device via said controller or a data server operatively associated therewith.

In accordance with one embodiment, the method further comprises automatically recognizing, via said network-accessible controller, association of distinct registered user identifiers with distinct local data connections via said given fixed data network address; and responsively, automatically incrementing said available data communication bandwidth associated with said given fixed data network address based on a concurrent number of said distinct local connections.

In accordance with one embodiment, the method further comprises relaying all data communications from said electronic device through said controller via a client application executable on said electronic device.

In accordance with one embodiment, said client application is only operable subsequent to authentication of said given user identifier via said controller such that all data communications relayed from and to said electronic device in respect of said client application are relayed in respect of said given user identifier post-authentication.

In accordance with one embodiment, said increase in said available data communication bandwidth is made indiscriminately available to all active local data connections at said given fixed data network address.

In accordance with one embodiment, said available data communication bandwidth at said given fixed data network address in absence of a registered user connection is automatically set to a designated basic bandwidth available to non-registered users.

In accordance with another broad aspect, there is provided a network-accessible controller or non-transitory computer-readable medium having statements and instructions stored therein for execution by a digital processor to automatically implement any of the above-noted methods.

In accordance with another broad aspect, there is provided an automated computer-implemented method for modulating data communication privileges for each of a plurality of fixed data network addresses in a fixed data network, the method comprising: maintaining a data store of registered user identifiers; automatically recognizing, via a network-accessible controller operatively linked to said data store, association of a given registered user identifier with establishment of a local data connection from an electronic device via a given fixed data network address; and responsively, automatically increasing data communication privileges associated with said given fixed data network address until termination of said local data connection.

In accordance with another broad aspect, there is provided a method for automatically migrating wireless data network communications on a mobile device having a mobile radio and a Wi-Fi radio between a mobile data network and a Wi-Fi data network, respectively, the method comprising: establishing a mobile data network connection over the mobile data network via the mobile radio; exchanging data communications via said mobile data network connection; detecting availability of a Wi-Fi data network connection within range of the Wi-Fi radio; disabling said mobile data network connection in favour of said Wi-Fi data network connection; and resuming said data communications via said Wi-Fi data network connection using said Wi-Fi radio.

In one such embodiment, the method further comprises: upon dropping said Wi-Fi data network connection, re-enabling said mobile network connection; and resuming said data communications via said re-enabled mobile data network connection.

In accordance with another broad aspect, there is provided a non-transitory computer-readable medium having statements and instructions stored thereof for execution by a digital processor of a mobile device having a mobile radio and a Wi-Fi radio, to migrate wireless data communications between a mobile data network and a Wi-Fi data network.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 11 is a table showing different illustrative data allocation packages and corresponding usage metrics available upon subscription to a mobile network operator supporting implementation of a virtualized smartphone-over-data service, in accordance one embodiment;

FIG. 12 is a table showing different illustrative services and features available to subscribers of the different illustrative data allocation packages of FIG. 11;

DETAILED DESCRIPTION

Figure 1:
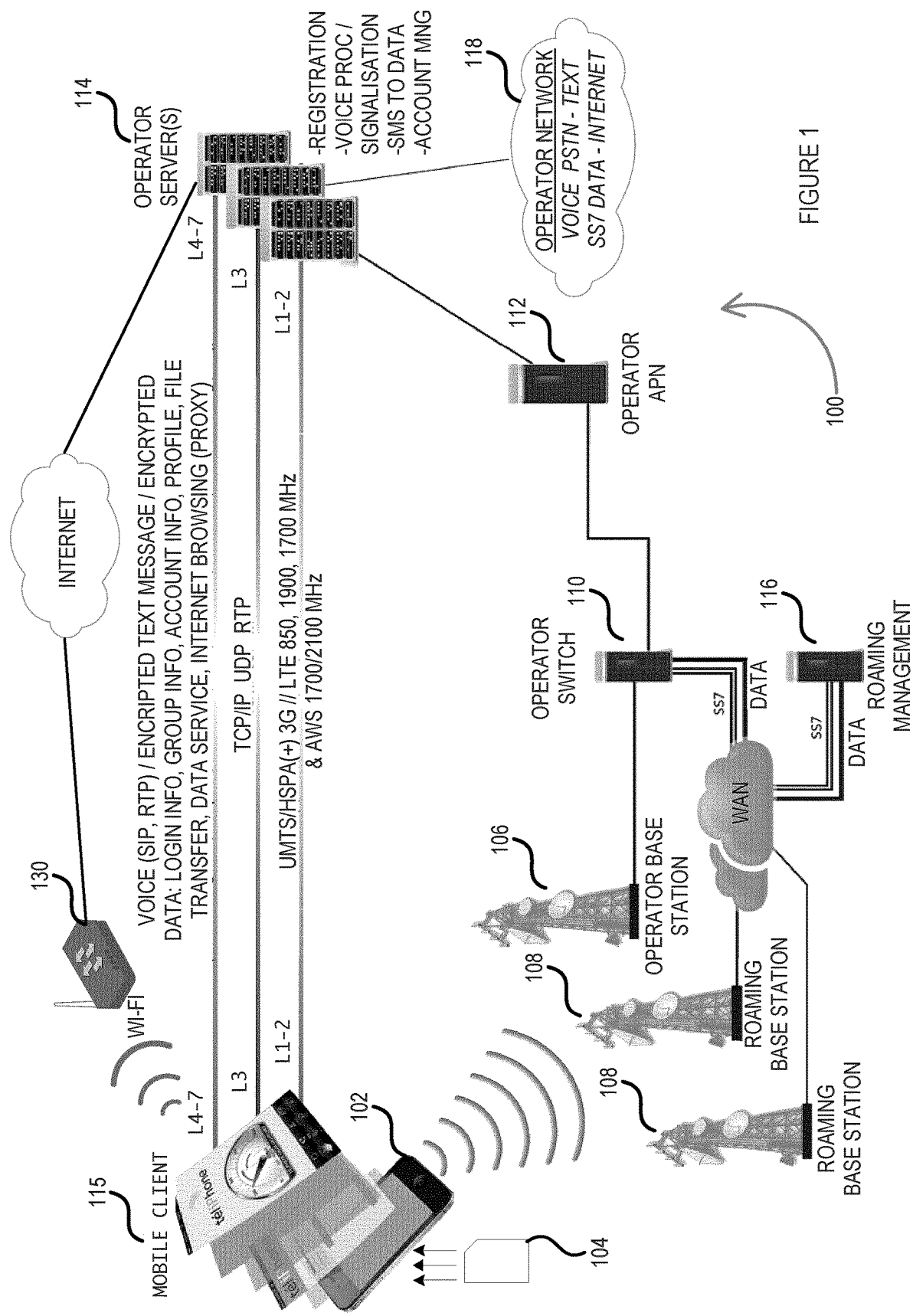
FIG. 1 is a network diagram of a voice-over-data intermediation system, in accordance with one embodiment.

For simplicity, the following will make general reference to mobile operators and carriers to encompass MNOs, VMNOs and other such types of mobile network operators/carriers.

General reference will also be made to mobile communication networks to encompass different types of networks commonly known as cellular networks or mobile telephone networks that are generally directly or indirectly managed, operated and/or leveraged by mobile operators to provide mobile services to end users. Accordingly, while the description provided herein may focus more specifically on a particular type of mobile network (e.g. GSM networks), it will be appreciated that the embodiments described herein may also be implemented over different types of mobile network architectures, standards and technologies (e.g. CDMA, UMTS, etc.) without departing from the general scope and nature of the present disclosure.

Further, the following will make general reference to mobile communication devices to encompass different devices amenable for interfacing with and communicating over such mobile communication networks. While these devices may also be amenable for communicating over other types of wireless communication networks, such as Wi-Fi, Bluetooth, NFC, etc., such wireless network communications should not be confused with the mobile network considerations described herein. That being said, and as will be described in greater detail below, some of the features and functions provided by embodiments of the virtualized smartphone environment and telecommunication services described below may also be made available to registered users via other data connections that may include wireless connections to Wi-Fi networks and the like, and standard landline Internet connections. Accordingly, Wi-Fi network connections will be referred to as such to encompass not only standard Wi-Fi network connections but also similar data networks commonly available via local or regional wireless access points (WAPs) and the like. Generally, mobile network connections will be differentiated from fixed or static wireless connections by the general nature of such connections that, while also available within the context of larger network footprints for instance in an installation consisting of multiple WAPs sharing a unique SSID, will generally be accessed by mobile devices confined to such installations for a given period of time, as apposed to mobile connections that can be maintained from cell to cell in a widespread cellular network.

For greater clarify, wireless communications invoking mobile or cellular network will be referenced as such and differentiated from fixed or static wireless communications otherwise accessible via a wired or wireless connection (e.g. home, office, or public) to a data network access point to a residential or commercial data network, such as made available over standard network infrastructure provided by an internet service provider (ISP) or the like, which may include xDSL, cable, EoC, fibre, fix wireless, satellite, etc.

In general, the illustrative systems and devices described herein allow a subscriber to a given mobile operator to partake in traditional mobile services using, in accordance with some embodiments, any mobile communication device operationally associated with this mobile operator. In some embodiments, the subscriber is provided access to these services by way of a virtualized telephony environment, generally and interchangeably referred to as a smartphone-over-IP (SoIP) or smartphone-over-data (SoD) environment, or an Internet personal communication system (iPCS) client. This thin client environment is generally supported if not deployed by the mobile operator to circumvent traditional voice and text-based telephony subscription packages through the provision of a complete telephony-over-data system that is subject to the same data usage charges and/or rates applicable in the context of more standard mobile data communications, such as Internet browsing, email, social networking and the like. Accordingly, this virtualized configuration may allow the subscriber to take advantage of significantly lower mobile data network rates, even or particularly when roaming on another network not directly supported by the subscriber's home network operator, while benefiting from various security and confidentiality enhancements not available with standard mobile telephony.

Accordingly, and as will be further detailed below, wireless communications to and from a user's wireless communication device may, in accordance with some embodiments, be communicated over, and seamlessly or near-seamlessly migrated between, different data networks on the basis of a user profile registered with and maintained by the all-data Smartphone-over-Data operator and/or service provider. For instance, data communications may be equally channeled through mobile and fixed data networks to one or more system controllers/servers configured to relay all data communications to and from a user's mobile device once registered and authenticated thereby. In some considerations, mobile data communications may be channeled over both home and roaming mobile operator networks, while also being conveniently channeled over fixed data networks so to bypass or circumvent traditional mobile network infrastructures. As such, while each registered user is effectively registered with the all-data SoIP or SoD service operator for all data communications irrespective of the network access point invoked for such communications, registered system users may effectively extend their home mobile network coverage beyond their home mobile operator network to leverage any and all accessible fixed data networks (e.g. residential, commercial, public, etc.). Accordingly, in some embodiments, a registered iPCS user may consider as their extended home network any data network and access point (mobile or fixed) that does not invoke roaming mobile data network coverage on a visiting network. For example, a SoD operator providing home mobile network coverage in one geographical area may provide extended home network coverage to registered users in another geographical area via accessible fixed data network connections in that area (e.g. via residential, commercial or public Wi-Fi node or iPCS wi-Node) and only effectively invoke mobile roaming network coverage and related roaming usage agreements upon temporarily connecting to the system via a roaming mobile network connection when such fixed network connections are not available. This may not only greatly reduce applicable mobile roaming restrictions or expenses (monetary, data usage rates, etc.) on the user, but also increase profitability and flexibility for the system operator. These and other examples will be described in greater detail below.

In the particular examples provided below, the iPCS system is implemented centrally by or in association with the network operator. Generally, the system is interactively implemented with the subscriber's current (i.e. logged-in) mobile device upon subscriber authentication, which unlocks a virtualized telephony environment on this device that interfaces with the network operator's server-based (i.e. cloud-based) telephony and other applications over an available mobile data network (i.e. local or roaming). Using this centralized implementation, the subscriber may further benefit from increased flexibility in terms of device interchangeability, mobility and personal data access.

For instance, subscribers may gain centralized access to telephony-related data such as contacts, call history, text-message history, etc., that can be stored centrally in association with the registered user's account and made available via the thin client application.

This may also promote greater data security by centrally storing all sensitive data on the network operator's server(s) such that unauthorized access to a subscriber's phone, be it lost or stolen, will leave them less vulnerable to data losses and inappropriate information gathering and usage. Of course, the subscriber may also appreciate the ability to use different mobile devices without needing to transfer relevant data (i.e. traditionally done by transferring a user's SIM card to a new phone, but only when the old SIM card is compatible with the new phone).

Further, as will be described in greater detail below with reference to one particular embodiment, by centralizing telephony functions over a data network and by providing access thereto via a subscriber data login authentication process that is untethered to the physical device in question, the subscriber can access these functions from any mobile device compatible with this data network. In some embodiments, while the mobile devices (or SIM card) issued by a given mobile operator may be integrally associated with the mobile operator, thus facilitating access to the operator's centralized telephony-over-data environment, the issued devices and/or SIM cards may remain user-agnostic in that they need not be specifically and uniquely characterised for association with a particular subscriber, but rather, a given subscriber may seamlessly operate any of the devices issued by the operator (or in the context of a SIM card enabled device, any device configured to operate on a SIM card issued by the operator) to gain authenticated access to their own telephony services, and that, irrespective of how many other subscribers may have common use of this device. In other words, while traditional mobile telephony networks will rely on a particular International Mobile Subscriber Identity (IMSI) code, which is provisioned directly by the SIM card in GSM, UMTS and LTE networks, to identify and associate a network access package and privileges to a given device on their network, the platform considered herein will rather rely on a furnished username and password, or other verifiable credential, to coordinate mobile access privileges. Accordingly, subscriber and usage flexibility is drastically increased relative to the standard model, and may provide innumerable options in respect of subscriber package and access customizations (e.g. terms of use, access permissions, restricted usage periods, restricted application or data access, geographical permissions/restrictions, etc.), data sharing, device sharing (e.g. within a given organisation, business, or family unit, or between friends, colleagues, etc.) and the like.

Further, and as will be expanded on further below when describing one embodiment of the virtualized SoIP environment, non-subscribers may also gain access to the virtualized services offered by the iPCS. For instance, a non-subscriber may nonetheless register with the iPCS and load and execute the SoIP environment on their device to benefit from its various advantages while corresponding through this environment over an pre-existing native carrier data subscription. Various cross-carrier implementations and options will be described in greater detail below, particularly in considering non-subscriber SoIP environment users and their interactions with other subscriber and non-subscriber users, as well as other generally unrelated telephony contacts.

Mobile Subscriber Network

With reference now to FIG. 1, and in accordance with an embodiment, a mobile subscriber system, generally referred to using the numeral 100, will now be described. In the context of FIG. 1, a subscriber to a given mobile operator or carrier operates a mobile communication device 102, such as a mobile phone or tablet, that generally combines both telephony (e.g. voice/text) and data (e.g. Internet browser, e-mail, etc.) communication capabilities. Generally, the mobile communication device 102 will include a graphical user interface such as a touchscreen or other interactive screen, a processor, a memory and a mobile transceiver operable to exchange voice and data with the mobile communication network. The device 102 may further comprise other wireless communication transceivers, such as those operable to communicate over a Wi-Fi network, or again implement various near-field (e.g. NFC) or short-range (e.g. Bluetooth) communications, as commonly available with most mobile phones or tablets. Other device components, such as a GPS receiver, camera, and the like, may also be considered. As discussed above, different mobile communication standards, architectures and technologies may be considered in the present context, as should be readily apparent to the person of ordinary skill in the art, without departing from the general scope and nature of the present disclosure.

In this example, the mobile communication device 102 further includes a removable computer-readable authentication medium 104, such as a SIM card or the like, in this case issued by and thus registered to the designated mobile network operator. Generally, the authentication module should be compatible with authentication in the mobile communication networks that the subscriber wishes to utilise. In this example, the authentication medium 104 is automatically authenticated upon operating the mobile device in range of the mobile communication network, be it via a home network base station 106 of the mobile operator in question, or via a roaming base station 108 and network operated by a distinct network operator with which the designated mobile operator has an existing roaming agreement. In any event, the authentication medium will be authenticated as being registered with the designated mobile network operator and thus automatically gain mobile access to those services associated with this authentication medium.

In standard mobile network systems, as noted above, the subscriber's identity would be integrally associated with the mobile device's SIM card such that, upon network authentication, the subscriber's device would automatically gain access to the various mobile services associated with and by the subscriber's designated mobile operator service package. Data services could then be accessed and monitored via the network operator's respective data service access points identified by respective access point names (APN) stored in the mobile device in association with the authentication medium (e.g. an Internet APN, MMS APN, etc.), whereas mobile telephony services such as voice and SMS-text could be managed and monitored via standard circuit switched network management for home and roaming network access. Ultimately, the user's identity would be managed, and its account appropriately tracked and billed as a function of the SIM data extracted from the mobile device.

In the example of FIG. 1, while the authentication medium 104 is configured to authenticate registration with the designated mobile network operator, the authentication medium will generally remain user-agnostic, in that all mobile devices issued by the same designated mobile operator will be equally identifiable as registered with this mobile operator without specificity as to the mobile subscriber. Accordingly, different subscribers may use the same device, and thus the same authentication module, without sharing a same subscription package with the designated mobile operator. Likewise, a same subscriber may use different devices 102, and thus different authentication modules 104, to access a same subscription package with the mobile operator. This may also expedite the mobile device acquisition process at an operator's retail store as the device's authentication medium need not be pre-authorized and registered with the subscriber. Rather, a new user may instead seek to open a new account with the operator upon accessing the operator's registration page over a regular Internet connection, and set the identification data to be used for subsequent subscriber authentication, described below.

In order to authorize and monitor access to and from specific subscribers, the designated mobile operator will effectively grant equal initial authorization to mobile devices operating on their registered authentication module in the form of restricted mobile data access over the mobile communication network via operator switch 110 to a designated mobile data network access point identified by a common access point name 112. In the illustrated embodiment, the access point name 112 acts as a mobile data gateway (i.e. Internet proxy) that funnels all data communications from the mobile device 102 to the operator's server(s) 114, where an authentication engine (e.g. via RADIUS application/protocol) will first seek to authenticate the user of the device 102 as a current subscriber to the mobile operator and thus authorize access to the various data network services enabled by the subscriber's account and profile. In one example, a client application 115 on the mobile device 102 will access subscriber identification data (e.g. via manual input or via a secure password management application) and forward this data to the operator's authentication engine for authentication and authorization. Once authorized, the MAC address of the mobile subscriber's current device (i.e. subscriber can access services via any iPCS or other data-network-ready device as will be discussed below) will then be authorized by the Internet proxy and the mobile subscriber will gain access to one or more data network applications accessible through the access point name and operator server(s) and operable, at least in part, via the user interface of the mobile device.

In the illustrative embodiments described below with reference to FIGS. 3 to 10, the client application 115 consists of a thin client application loaded and executed on the client device 102 to implement a virtualized smartphone-over-IP (SoIP) environment whereby all accessed functions and features in fact reside and execute on the system's server(s) 114, the subscriber interfacing therewith via the virtualized SoIP environment. Further details as to the virtualization of a SoIP environment, both within the context of mobile subscribers to the mobile operator system described herein, but also for the provision of data-telephony services to non-subscribers that nonetheless load and execute the SoIP environment as registered users of the system's various services.

Ultimately, each user's data consumption as an authenticated mobile network subscriber (e.g. when operating a device authenticated as registered with this network operator) will be monitored by the operator server(s) for account management, reporting and billing purposes. Clearly, where the subscriber is using a device under a roaming agreement with another network operator, roaming charges may also be associated with the user's account, which in the illustrated embodiment, is at least partially managed by a roaming management server 116. However, as will be described in greater detail below, such roaming charges may be accounted for within the context of the subscriber's mobile data allocation, which may in some embodiments, be indiscriminately consumed as a function of actual data usage irrespective of whether the user is operating the mobile device over a home network, a local roaming network or a foreign roaming network.

In the context of FIG. 1, once a subscriber has been authenticated by the operator's authentication engine, mobile communications other than those directed through the designated network access point will continue to be prohibited. Accordingly all mobile data communications must be funnelled through the designated access point name 112 to act as a gateway for all mobile applications executed by the subscriber. These mobile applications may include, but are not limited to, standard data network applications such as email, Internet browsing and the like, but also a voice-over-data application (e.g. VoIP) which may include voice processing and signalization, and a text-over-data application (e.g. SMS to data). Accordingly, the subscribers entire mobile experience, including both traditional data and telephony-over-data services may be provided through a single data network link to the operator APN 112, and channelled based on the application at hand via the operator's server(s) 114 while being exclusively exposed to data usage tracking and related accounting.

As external network communications such as standard mobile telephony will not be supported by the mobile operator in this system 100, the device 102 and its related authentication module 104 will become inoperable over available mobile communication networks without subscriber authentication via the operator's access point name 112. This feature thus provides an added advantage that, should a subscriber lose their device or SIM card, they will be effectively useless to another user without the subscriber's identification data (e.g. username and password). Applicable security and confidentiality features will be discussed in greater detail below, particularly in the context of the SoIP environment noted above that may, in some embodiments, be deployed for implementation by subscribers and non-subscribers alike. Namely, in the context of a virtualized SoIP environment, not only will the operator-registered device become communicatively inoperable without proper subscriber authentication, but all data related to the exchange of communications via the SoIP environment will remain securely stored on or in association with the system's server(s) and solely accessible via the virtualized environment upon being unlocked post subscriber/user-authentication.

The embodiment of FIG. 1 provides further illustrative detail as to illustrative abstraction layers involved in interfacing the mobile device's thin client mobile application 115 and those executed on the operator's server(s) 114. In particular, the physical and data link layers (L1-L2) may be implemented via UMTS/HSPA(+) 3G//LTE 850, 1900, 1700 MHz & AWS 1700/2100 MHz; network layers (L3) may be implemented over TCP/IP, UDP and/or RTP; whereas upper layers (L4-L7) may be used for voice-over-data applications and protocols (SIP, RTP)/encrypted text messages/encrypted data (e.g. login info), group info., account info, subscriber profiles, file transfer, data services and internet browsing (proxy).

In one embodiment, the iPCS combines traditional PSTN/CLEC phone services (public switch telephone network/competitive local exchange carrier) with the geographically independent and virtual services of VoIP while leveraging the benefits of implementing a thin client architecture that uses powerful and sophisticated cloud-based services to power a user's telecommunication needs. iPCS therefore integrates relevant functions into a native mobile service, merging traditional telephony with Internet telephony in a convenient, competitive and secure package. Using this approach, the iPCS can assemble an innovative and attractive suite of features and components. Furthermore, as introduced above, the iPCS environment and services can be made to execute on effectively any mobile device, and that, irrespective of whether the device is registered for mobile services provided by the iPCS operator/carrier. That is, any user of a mobile device, irrespective of its native carrier, can load and execute the virtualized iPCS/SoIP environment on their device and gain access the suite of iPCS services and advantages while also gaining access to a phone number from a choice of multiple countries (e.g. 58 countries in this example), making it a truly worldwide communication service.

Variable Data Network Implementation and Connection Migration

As introduced above, the registered user may also implement some or all of the features of the SoIP environment over an alternative (i.e. fixed) data network, thereby avoiding data consumption rates applicable to registered users of the iPCS framework. Namely, the thin SoIP Client operating on a user's mobile device may still communicate with SoIP servers irrespective of the data network supporting such communications, thereby allowing users on different data networks to benefit from the various features and functions of the SoIP network and infrastructure. Accordingly, a registered SoIP mobile network user may operate the SoIP environment over the system's (home or roaming) mobile data network and thus consume some of its data consumption allotment when it must, as monitored by the mobile APN, but may otherwise operate the same functions and features over a residential, commercial or public Wi-Fi (home) network 130 or the like (interchangeably referred to herein as a fixed data network to distinguish from traditional cell-based mobile data networks) without incurring mobile data plan consumptions. In the context of a free public Wi-Fi hotspot, such use thus becomes free of charge to the user. Similarly, a residential or commercial Wi-Fi network connection to an ISP can also lead to free SoD services beyond potentially applicable ISP service fees (discussed below). Different examples of available data network connections may include, but are not limited to, shared, open or secured residential or office Wi-Fi network connections, public hotspots (e.g. coffee shops, restaurants, hotels, airports, conference centers, etc.) and other such wireless data network connection providing one or more network access point recognizable by the user's mobile device and accessible, freely or upon manual or automatic entry of a network access code, username and/or password, to exchange data network communications over the Internet.

As with a mobile connection, all thin client network communications will be automatically routed to the operator's server(s) 114, thus funnelling all data network communications through these servers and providing ultimate control over, and access to, the user's interaction over the data network in providing enhanced services, user controls and management functions, and the like. Further examples will be provided below.

Figure 14:
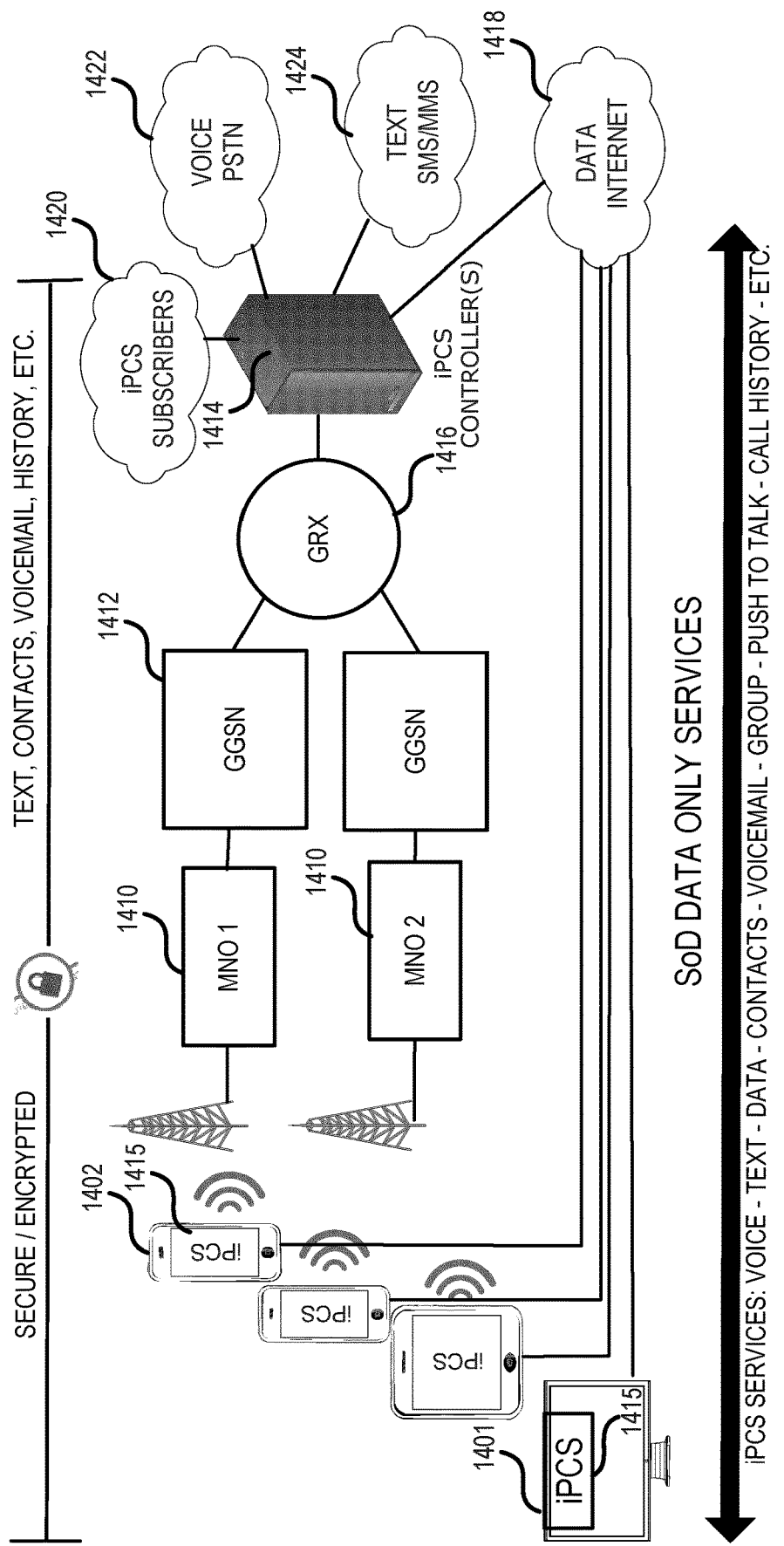
FIG. 14 is a network diagram of a mobile subscriber system, in accordance with one embodiment, that is accessible via a thin client application executable on distinct devices and useable over different data network connections to access various smartphone-over-data functions and features.

To further illustrate this principle, reference is made to FIG. 14, which again illustrates an exemplary network configuration and infrastructure of a particular embodiment of the iPCS platform. In this example, various communicatively-enabled devices are illustrated, consisting predominantly of mobile devices 1402 such as mobile phones, smartphones, tablets and the like, each generally configured to access and maintain at least one wireless data network connection. In this example, each mobile device 1402 is configured to have communicative access to a mobile network via an integrated mobile transceiver, and further access a wireless (e.g. Wi-Fi) and/or landline data network. As illustrated in this figure, a desktop or laptop computer 1401 connected to a data network may also partake in iPCS functionality by operating the iPCS client 1415. Likewise, a desktop or desktop computer leveraging a mobile device's wireless data network connection may also partake in such functionality. For greater clarity, reference will be made herein to mobile and fixed data network connections to respectively distinguish (home/roaming) mobile data network connections from residential, commercial or public wireless or wired data network connections.

In the context of a mobile connection, data traffic is automatically relayed via any one of a first or second mobile network operator network 1410 (whether the accessed mobile operator network is a native MNO operating the iPCS platform or a roaming MNO), a Gateway GPRS Support Node 1412, a GPRS Roaming Exchange 1416, and ultimately to the iPCS Controller(s) or Server(s) 1414 which will direct and funnel all data network traffic to and from the mobile device 1402 when executed via the mobile thin client application. Likewise, all data traffic originating from or destined to interface with the iPCS application on a given mobile device 1402, or desktop implementation alike, will be channelled via standard data Internet channels 1418 to funnel through the iPCS Controller(s) 1414 as well, thus allowing the user, and the system, to maintain iPCS functionality irrespective of the originating device or underlying data network connection. In this respect, the iPCS platform truly acts as a virtualized or cloud-based telecommunication platform for the purposes of delivering SoIP services and functionality, and beyond. Furthermore, as discussed in greater detail below, all data communications and exchanges between each respective device 1402/1401 and the iPCS controller(s) 1414, irrespective of the underlying data network, can be secured/encrypted (e.g. full SSL HTML5 encryption), as can all downstream communications to any other iPCS subscriber (1520) by virtue of their own respective iPCS thin client implementations (on any data-network-accessible client device). Otherwise, any voice/PSTN 1422, text (SMS, MMS) 1424 or other data network communications 1418 can be relayed to and from the subscriber's mobile device 1402 via the iPCS controller(s) 1414. Likewise, all user-related data (contacts, voicemails, texts, call histories/logs, etc.) are securely stored on and accessible from the iPCS servers 1414.

Further to providing full SoIP functionality over a free or otherwise cheaper Wi-Fi network connection, that effectively extend the mobile operator's home network coverage across multiple geographical areas, the implementation of a virtualized SoIP environment may further provide additional benefits over standard mobile phone implementations, such as it relates to the implementation of VoIP applications currently available in the market. For example, in one embodiment, the virtualized SoIP environment may be operated to initiate, establish and maintain VoIP or other voice-over-data calls with other mobile or landline devices by establishing the call through the system's servers 114, such as a voice-over-data server or the like configured to intermediate calls set from or to a user's mobile device over a mobile or fixed data network connection. While a voice data call can be established between the user's mobile device and the system servers 114, and that over a mobile or another available data connection, this call may be relayed over data or standard mobile or landline (i.e. PSTN) telephony channels as may be appropriate or required to establish a voice connection with the call's other party(ies). As noted above, where the call is being held over a free Wi-Fi or other fixed (home) data network connection, then the call does not consume the user's mobile data plan allotment.

Figure 15:
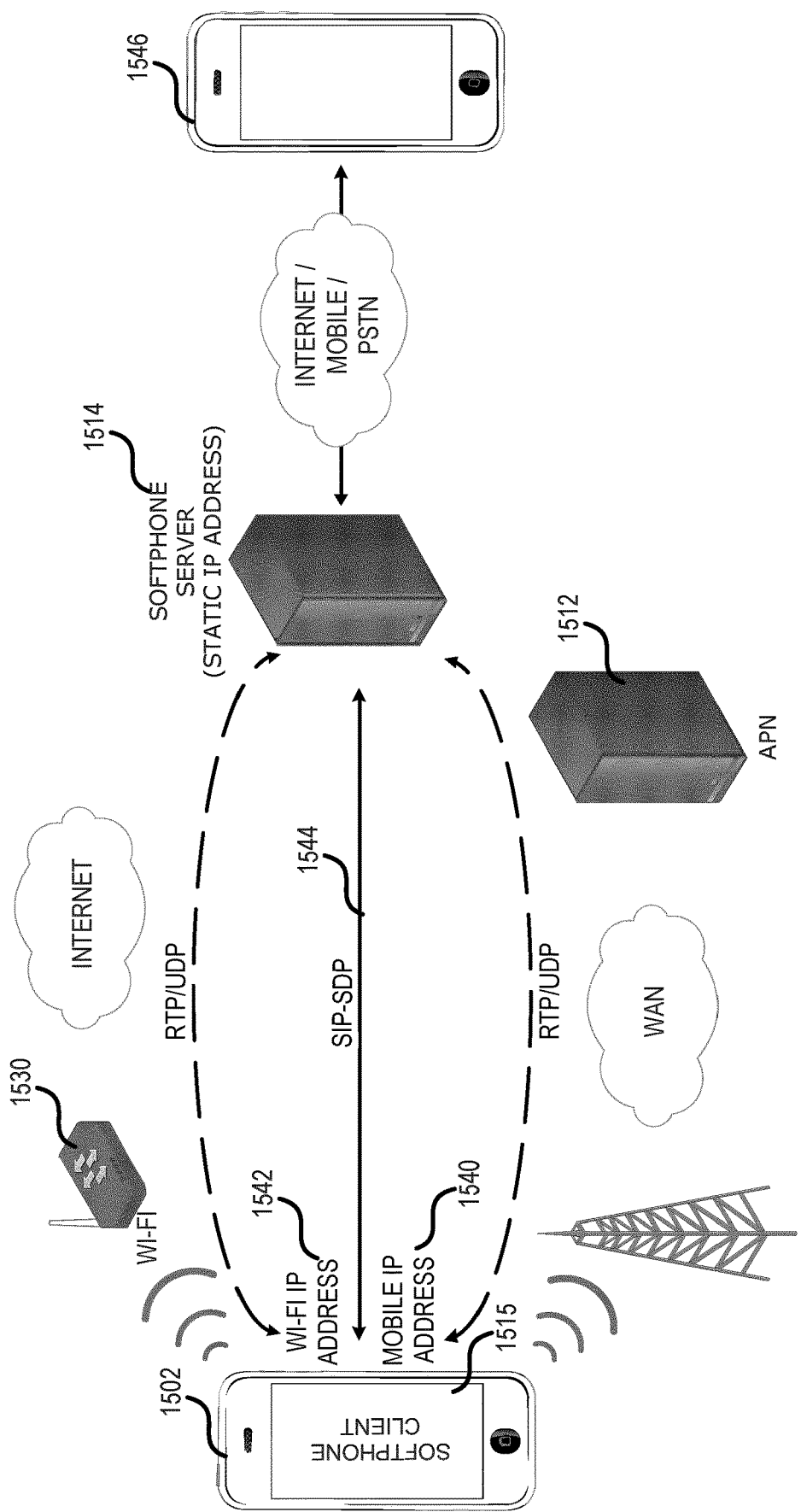
FIG. 15 is a network diagram of a mobile subscriber system, in accordance with one embodiment, in which voice-over-data communications can be seamlessly migrated from one data network to another without ongoing call interruption or re-initiation.

In one particular example, and with further reference to FIG. 15, a voice-over-data call intermediation setup is illustrated, in accordance with one embodiment, in which a voice-over-data call established via the system's server(s) 1514 can be maintained more or less seamlessly and uninterruptedly as a user's mobile device 1502 migrates from one data network connection to another, and that, irrespective of the data network connection type. In the illustrated example of FIG. 15, a softphone application 1515 (e.g. a virtualized SoIP environment such as SoIP client 115 of FIG. 1) initiates a voice-over-call with a designated voice-over-data server 1514 associated with the application 1515. For example, a call initiation request can be sent from the mobile application 1515 identifying a call recipient by way of an appropriate mobile or landline phone number, voice-over-data user account, or other data network identifier as will be readily appreciated by the skilled artisan.

Generally, the call initiation request will result in a call setup sequence between the mobile application 1515 and server 1514 over an originating data network connection, and a corresponding sequence between the server 1514 and a recipient device over an appropriate network connection for the recipient in question (e.g. mobile, landline and/or wireless data network, PSTN, etc.). Focusing here on interaction between the authenticated mobile user and client application, and the system server 1514, setup of a new VoIP call will generally entail a setup sequence via a signaling protocol (e.g. SIP, H.323, SCCP, etc.) followed by a media (i.e. audio) setup for the call that is generally is negotiated via SDP (Session Description Protocol) to describe media initialization parameters. The SDP is used to describe the capacity of each call end point, namely the codec(s) each end can support and to which IP address and port inbound media is to be sent to. In this case, the various call parameters for the server 1514 will be more or less set and static with a predefined IP address being made available to the mobile application so to direct voice data communications thereto to be subsequently relayed by the server 1514 to the recipient device over an appropriate communication network. As for the mobile device, an originating IP address will generally be defined by a mobile or wireless network connection currently being relied upon by the mobile device to initiate the call. In the illustrated example of FIG. 15, either of a mobile IP address 1540 and a Wi-Fi mobile address 1542 may be available to the mobile device 1502 to initiate and establish the call, in this case via the illustrated connection-type indifferent SIP-SDP path 1544.

Once the call has been initiated and established between the mobile device 1502 and its intended recipient (mobile device 1546 in this example), the server 1514 will not only act to relay inbound and outbound communications to and from the mobile device 1502, but also monitor inbound communications to identify any changes in the mobile device's data network connection and associated IP address. For example, traditional VoIP calls generally implemented via RTP over UDP, any intermediating gateway generally solely allowing for appropriate transcoding and relaying of the voice data communications to and from the respective call parties. As these standard protocols do not generally accommodate network connection changes or automated call re-initializations, when a given user migrates to a different data network connection, any ongoing call will be terminated and lost.

In this example, however, the server 1514 actively monitors inbound voice data communications originating from the mobile device 1502, for example, within the context of the activated virtualized SoIP account being used in association with the mobile device's softphone application 1515. Alternatively, or in addition, data traffic between the mobile device and server 1514 may be equally monitored within the context of other network data features and functions operating on the mobile client application, or again, within the context of a distinct data connection management or quality path (not shown) established and maintained between the mobile application and server 1514.

In any event, as all voice-over-data communications originating from the mobile application 1515 will be directed to the same fixed server IP address, all outbound voice data communications will be safely directed to the server 1514 irrespective of the underlying data network connection. Namely, even if the mobile device automatically switches between a mobile data connection and an available Wi-Fi data network connection, the connection to the server 1514 will be operatively maintained and all outbound data communications adequately relayed. Voice data communications inbound from the server 1514 to the mobile device 1502 will, however, be lost unless the server automatically recognizes the data network switch as these inbound communications will continue to be relayed to the originating data network connection IP address until such address is appropriately changed.

Accordingly, the server 1514 is configured to monitor inbound voice data communications originating from the mobile application 1515, particularly within the context of the user's virtualized SoIP account and automatically detect inbound voice data communications originating from a new data network IP address. Upon detecting use of a new data network IP address (and port), the server 1514 will automatically relay any subsequent inbound voice data communications to the new IP address (and port), thereby allowing the ongoing call to be maintained with little to no interruption. As such a relatively seamless and uninterrupted VoIP call intermediation technique is provided to maintain an active VoIP call despite possible data network connection changes, and that, without requiring a renewed SDP negotiation or re-invite.

To further illustrate this process, a user of mobile device 1502 sends a call setup request to server 1514 via a Wi-Fi network connection with a SDP indicating that its audio is available at IP address 192.168.1.1 on port 15555. Server 1514 responds with its own SDP indicating that its audio is at IP address 172.16.0.1 on port 10111. The call is established and the mobile device 1502 and server 1514 are connected and exchanging media via their respective IP addresses and available Wi-Fi network connection. During the call, the mobile device 1502 switches to Cellular 3G Internet and now has an IP address of 10.10.0.1. As the server 1514 is initially unaware of this change, it continues to send audio data to the initial IP address, which is now no longer available. Concurrently, the mobile device 1502 continues to send its audio data to the server 1514 at the same IP address on the same port, which the server still receives as it has maintained a fixed IP address and port.

In this particular case, however, the server 1514 monitors the incoming media on its port 10111 and detects that the originating media from the mobile device 1502 changed source IP (it is now coming via a 3G Internet connection with new IP address 10.10.0.1). The server 1514, without receiving a new SDP or Re-Invite, thus starts sending the media for that call to the new IP address and port to maintain the call with minimal interruption.

Figure 16:
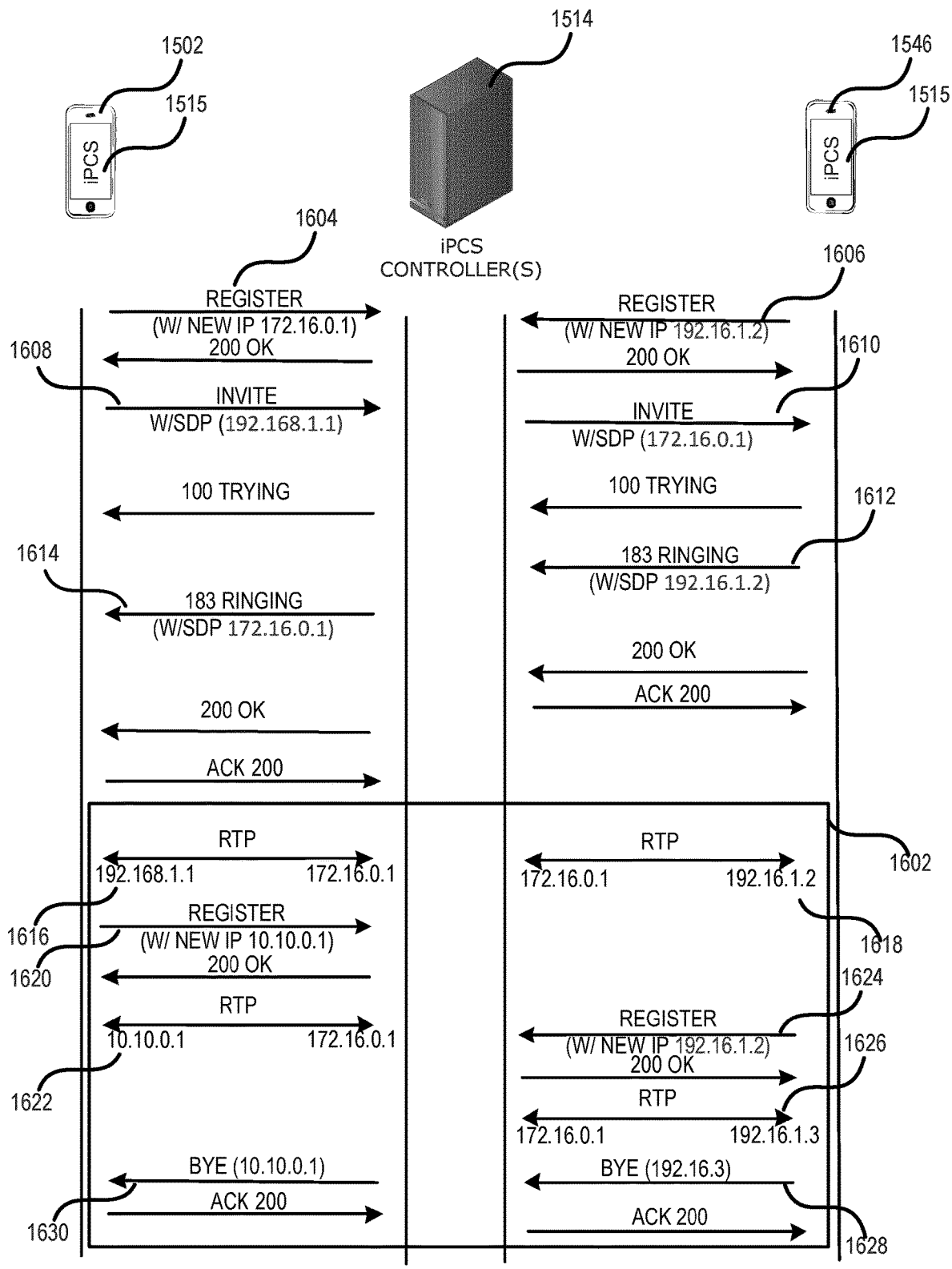
FIG. 16 is a communication flow diagram between respective communication devices interfacing with a data network service intermediary and in which voice-over-data communications can be seamlessly migrated from one data network to another without ongoing call interruption or re-initiation.

FIG. 16 provides one exemplary data network communication flow within the context of an end-to-end iPCS voice-over-data call in which each of the call participants are iPCS subscribers who, during the an ongoing call 1602, each respectively switch between data networks without dropping the call. In this particular example, each iPCS implementation 1515 executed on each of mobile devices 1502 and 1546, respectively, registers its current IP address with the iPCS controller 1514, which doubles as a logical iPCS Registrar in this example, via respective SIP REGISTER requests 1604, 1606. Each IP address is thus appropriately stored in a location service associated with the iPCS controller 1514. In this example, each iPCS implementation is currently registered as communicating over a Wi-Fi network or the like.

At some point, an INVITE 1608 is initiated by the calling device 1502 having a recipient device identifier associated with the recipient subscriber of device 1546 (e.g. subscriber phone number, contact name or ID, nickname, etc.) with an SDP identifying the calling device's current IP address (192.168.1.1) and available communication port. A corresponding INVITE is relayed to the recipient device 1546 and iPCS implementation 1515, optionally with calling party details (e.g. call display), and an iPCS controller SDP identifying an active controller IP address for the call. It will be appreciated that while the call intermediary server 1514 is illustrated herein as collocated with the logical iPCS Registrar, the iPCS system may equally be implemented via distinct and distributed servers located in different locations and thus, operating a distributed communication path between respective call parties. Accordingly, while single intermediary device is illustrated in this example as serving each call party within the context of a given call, multiple servers and/or controllers may equally be distributed over distinct geographical regions, for example, to support and implement calls between various parties.

For simplicity in this example, the call is uniquely intermediated by controller 1514 operating the call from a singular IP address 172.16.0.1 though each call party could interface with distinct and operatively interlinked server IP addresses to seamlessly relay voice data between call party devices and iPCS implementations.

In this example, the called device 1546 responds to the INVITE 1610 with a RINGING SIP response 1612 along with the called device's SDP confirming it's current IP address. The called party's RINGING response is translated into a RINGING SIP Response 1614 from the server 1514 to the calling device 1502, itself identifying the Server's available IP address and port.

Upon call confirmation at each end with the intermediary server(s) 1514, the call is initiated over RTP, on the one RTP leg 1616 between the calling device IP address (192.168.1.1) and the server IP address (172.16.0.1), and on the other RTP leg 1618 between this same server IP address and the called party IP address (192.16.1.2).

At some point during the call, the calling device 1502 automatically switches to a mobile (e.g. 4G LTE) data network connection located at mobile IP address 10.10.0.1. The SIP Client 1515 on the calling device 1502 will thus dispatch a new SIP REGISTER Request 1620 to the server 1514, the IP address identified therein being useable downstream to close the SIP call loop. For example, while the return path in a standard SIP exchange is generally defined by the VIA header of an SIP packet (e.g. as originally identified in an earlier INVITE Request 1608 or ACK response in this example), the iPCS controller 1514 in this example may be otherwise configured to define the SIP return path address and port by the client address and port identified by the latest SIP REGISTER request received. Accordingly, while the last-received SIP packet VIA header may incorrectly identify a previous IP address in this example, leverage of the SIP client's immediate dispatch of a new REGISTER request identifying an updated IP address and port will ensure that future SIP messages sent by the server will be directed to the currently active client IP address and port.

The network connection switch will also trigger the server 1514 to automatically redirect future inbound call data communications to the calling device 1502 to this new mobile IP address, as discussed above. For example, while the server stores the new data address (and port) responsive to receipt of the SIP REGISTER request 1620, the server may concurrently observe receipt over RTP of inbound voice data packets from the calling device iPCS implementation as originating from the new mobile IP address and responsively redirect inbound RTP voice data packets to the new caller mobile IP address independently of the new SIP REGISTER Request. In any event, while a few data packets may be lost in the transition, the established call 1602 may be more or less seamlessly maintained uninterruptedly without renewed SDP negotiation between the calling device and server, and particularly without any administrative transactions being required with the called party device 1546. Effectively, the one RTP leg 1622 is merely redirected to exchange voice media between the new mobile IP address (10.10.0.1) and the static server IP address 172.16.0.1). In this particular implementation, SIP handlings with the calling device may also seamlessly migrate to the new data address by extracting the new IP address from the new REGISTER Request 1620 for downstream use.

Similarly, the called party device 1546 may itself migrate to a distinct data network connection, in this case another Wi-Fi data network associated with IP address 192.16.1.3. A new SIP REGISTER Request 1624 is thus relayed to the intermediary server 1514 and the new IP address stored in the location service, while allowing the second RPT leg 1626 to pursue more or less seamlessly between the iPCS controller 1514 and called party device 1546 via the new called party IP address and port.

Further along, the called party device 1546 will issue a SIP BYE Request 1628 to the server 1514, which will be intermediately relayed as a corresponding BYE Request 1630 by the server to the calling device 1502 at its new and current mobile IP address and port, as previously registered via REGISTER Request 1620.

As will be appreciated by the skilled artisan, the automatic identification and extraction of SIP, SDP and RTP communication parameters may be invoked in some embodiments to expedite some processes at the intermediary server 1514, though not necessarily so as the iPCS server may otherwise intervene to dynamically detect IP address changes and redirect inbound/outbound communications accordingly, particularly within the context of thin client iPCS implementations that more or less maintains an active link with the iPCS controller irrespective of ongoing voice data or service usages. Namely, in one embodiment involving the implementation of an ongoing thin client link to the SoD server(s)/controller(s), most VoIP and other intermediated services will be implemented to some extend via subsignaling protocols implemented within the greater context of an ongoing data link with the SoD intermediaries. Nevertheless, the above examples illustrates how existing VoIP protocols can be implemented and leverages to seamlessly migrate ongoing calls via an iPCS intermediary, which may in this example, double as SIP Registrar and back-to-back user agent (B2BUA) for the establishment and maintenance of cross-network calls between iPCS subscribers, while also acting as a gateway and conversion link to non-subscribers over alternative communication networks (e.g. PSTN, Mobile voice, etc.).

In light of the above, the user's mobile device 1502, and SoIP application executed thereon, allows a user to initiate and maintain a voice-over-data call over any available data connection, and to seamlessly switch from one network and network type to the other without dropping a call or requiring call re-initialization. Accordingly, given this configuration, provided voice-over-data calls are directed through and intermediated by the voice-over-data server(s) or controller(s) 1514, the user's available mobile network is effectively extended to include any available Wi-Fi access point and router to which the user has authorized access, this wireless router effectively becoming a cellular node in the user's available network infrastructure. In other words, the voice-over-data application can be implemented to provide a layer 3 service over any IP-enabled layer 2 infrastructure (e.g. LTE, Wi-Fi, Wi-Max, etc.) that is operatively connected to the Internet, irrespective of the underlying layer 2 protocols being implemented. Consequently, the iPCS server 1514 can act as a layer 3 thin client SoD controller allowing for seamless migration between data network connections, network types and network service providers so long as the mobile device has authorized access to these networks.

In yet another exemplary implementation, the all-data SoIP implementation described above may be further extended to enhance or regulate residential or commercial data network connections (jointly referred to herein as fixed, local and extended home networks), for example, such as those provided via standard landline data network service providers to the home or office. Moreover, by constantly funneling all data network communications to and from a user's mobile device via a thin client iPCS application and corresponding iPCS controller(s), as described above, data network access management can be extended beyond mobile network access privileges to residential and/or business data network service provisions. For example, a registered mobile SoIP user will be recognized as described above when communicating over a home or roaming mobile data network by virtue of their SoIP subscription credentials (e.g. user ID, which may be untethered to a device ID), since all mobile data traffic will be automatically funneled through the mobile network operator's APN; device identification can also be tracked and monitored by the mobile operator, for example, via the device's IMSI code or other like device characteristics commonly relayed for mobile connectivity.

Upon invoking a fixed (e.g. residential or commercial Wi-Fi) data network connection, data traffic will still be automatically relayed through the operator's data network servers/controllers by the thin SoIP client operating on their device, as shown in FIG. 15 for example. Accordingly, while the mobile data connection can ultimately be dropped in favour of the (free) local network, the operator's ability to monitor and track the user's data network traffic will be maintained, again via the user's subscription credentials and device ID (IMSI, etc.), but also via the IP address of the local data network connection. Moreover, the iPCS controller(s) can continuously monitor and track user data network activity via the user's credentials (i.e. when logged into a particular subscriber account), device ID (which may be the same or vary for a given user as they log into the service from different devices and/or share a subscription with different users such as in the context of a family or business plan), and data network access connection address (i.e. mobile or local/Wi-Fi IP address).

In one embodiment, a user mobile subscription package as described above may be integrally linked to their residential or office (local) data network access plan in that a same subscription profile may be applied to data network access privileges irrespective of whether the user is invoking a home or roaming mobile data network connection or a local, i.e. residential or office "extended home" data network connection. Usage rights and privileges may be monitored and tracked against each subscriber, as noted above, irrespective of the invoked data network connection, with the option to customize such access rights and/or privileges depending on the type of network invoked (mobile home network; mobile roaming network; extended home residential, commercial or public network, etc.) by cross-referencing user identification with network access point identification.

In a basic implementation, a user could subscribe for a local (residential or commercial) extended home network connection and pay a standard monthly rate, while also invoking the type of fee arrangements considered above with respect to data usages on different mobile networks (home, roaming, etc.), while also benefiting from free access on public networks such as via a public Wi-Fi hotspot connection. As will be described below, greater versatility and customization may be leveraged to enhance service offerings for both the user and service provider.

Figure 19:
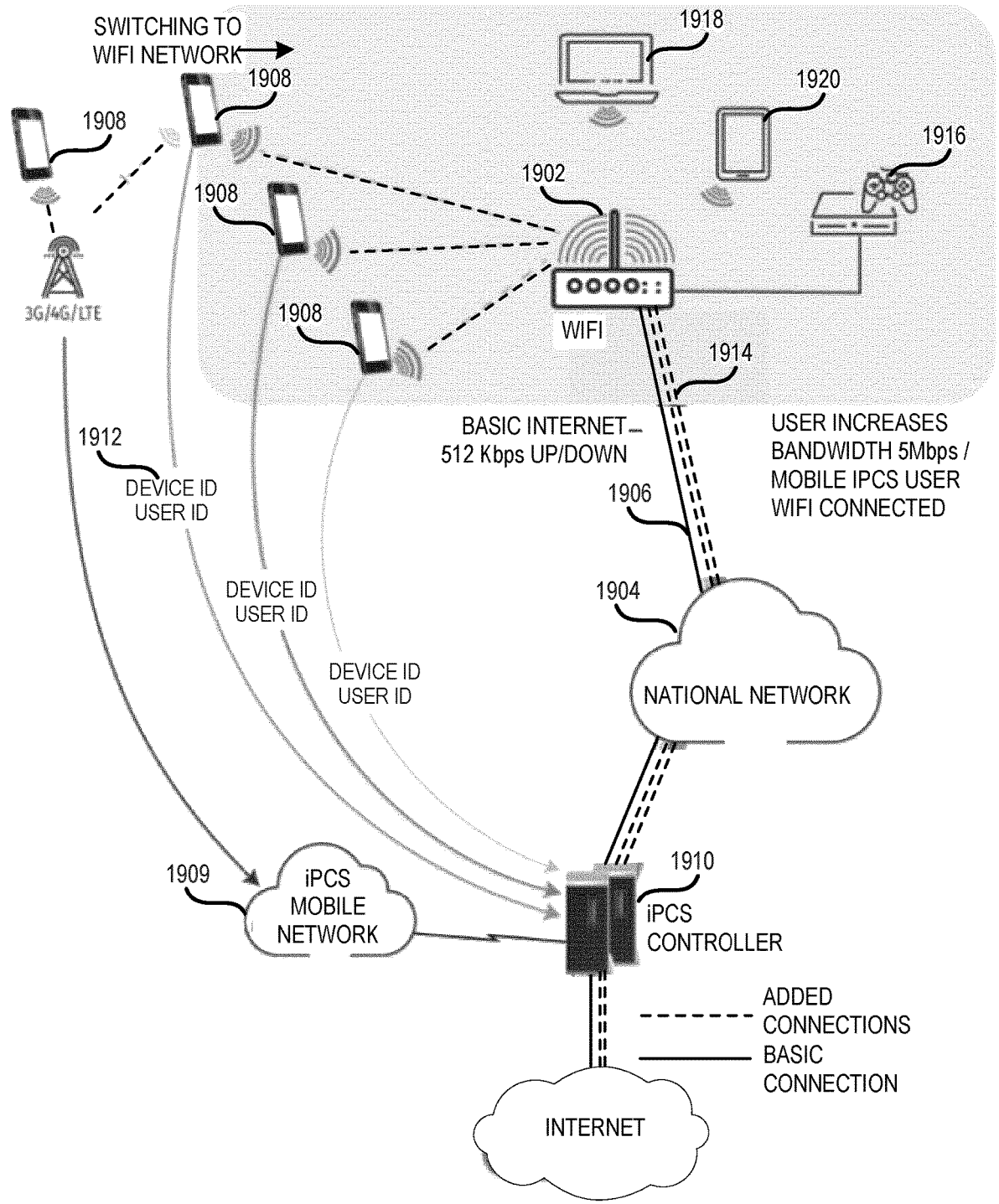
FIG. 19 is a network diagram of a data communication subscription system, in accordance with one embodiment, in which a bandwidth to a fixed data network address is dynamically adjusted as a function of subscriber connectivity via this fixed data network address.

Given the centralized access to user and network access identification across networks, which was heretofore generally unavailable using traditional means, particularly within the context of residential, commercial and public connections, greater versatility and customization may be applied. For instance, in one embodiment, and with reference to FIG. 19, the available bandwidth of a given local network connection may be automatically adjusted as a function of the number of subscribers currently invoking the local connection. For instance, a basic Wi-Fi accessible landline connection, illustrated by residential or commercial WiFi hotspot access point 1902, may be established for residential or office use over a national or regional network 1904 (e.g. xDSL, cable, EoC, fibre, fix wireless, satellite, etc.). As will be appreciated by the skilled artisan, different residential/commercial data network architectures may be considered herein without departing from the general scope and nature of the present disclosure, as can different CLEC or ILEC models implemented in association therewith to accommodate this and related Internet Service Provider (ISP) offerings. For example, a dedicated or shared iPCS controller may be used in the implementation of ISP so to interface with residential/commercial services, either directly or via an appropriate network to network interconnection (NNI) with an incumbent fixed network access provider and respective last mile residential/commercial (e.g. DSL or cable) connection.

In the absence of a registered user, a basic connection 1906 (solid line, e.g. 512 Kbps) may be configured by the controller to offer limited bandwidth, e.g. sufficient bandwidth to support essential traffic such as home security, user logins, device connectivity (IoT), etc. This may allow for connection and essential services to be maintained while blocking other more substantial data services accessed by non-subscribers (e.g. neighbours, walk-bys) which may seek to freely benefit from the open connection, for example.

Once a registered iPCS user on the (home or roaming) mobile network 1909 approaches the local access point 1902 to an extended home network connection, or again when a disconnected registered user invokes a new connection within range of the access point 1902, their device 1908 may automatically pick up the local Wi-Fi connection and transfer/initiate user data traffic therethrough. The iPCS controller 1910, which maintains tracking visibility of the user throughout the migration/initiation via the user and/or device ID 1912, can cross-reference this ID against a database of associated subscriber extended home local network addresses (e.g. residential or commercial IP addresses), and upon identifying a match, increase an available bandwidth on the invoked local network connection as part of this user's registered user package.

For example, each registered user accessing the local data network connection 1902 can invoke incremental bandwidth increases (i.e. added connections 1914 (dashed lines, e.g. 5 Mbps/user)) to accommodate the increased load that may ensue given the added users on the local network connection 1902. Likewise, as a registered user disconnects from the local network, local network bandwidth may be correspondingly reduced. In the interim, the added bandwidth connection(s) can benefit the entire household/office by accommodating increased bandwidth to other network-interfacing devices that may not be associated with the registered iPCS service (i.e. may not implement the thin client application thereon), such as Wi-Fi enabled video game consoles 1916, televisions 1918, tablets/computers 1920, and/or other guest devices operated by registered and/or non-registered users.

While a dynamically adjustable bandwidth provides one example of an adjustable connection parameter, other data throughput and/or usage metrics may also or alternatively be adjusted on the same basis. For example, a local connection can impose non-user data usage limits over a given time period allowing limited data throughputs in the absence of a subscriber, while tracking data usages in the presence of one or more subscribers against a larger data allocation. These and other usage metrics, restrictions and privileges may be considered herein without departing from the general scope and nature of the present disclosure.

Likewise, while subscriber extended local home network access privileges may be managed independently for each subscriber location (e.g. on a residence-by-residence or office-by-office basis), more generalized or global access privileges may otherwise be implemented to universalize access privileges.

For example, in one location-by-location embodiment for the provision of residential services, each family member within a given household that also subscribes to mobile and at-home iPCS services may be associated with a corresponding local extended home network access point and address to invoke corresponding increases in local bandwidth when connected to the iPCS controller through this particular access point. Namely, the user ID of such users may be monitored by the iPCS controller(s) and cross-referenced with their local home IP address to automatically modulate local data network access parameters associated with this local home IP address based on the number of these users actively connected through this local IP address at any given time. On the other hand, these users will not otherwise gain or invoke any further local network access privileges when connecting through another local access point, such as when connecting through the local IP address of another household or office where access privileges are rather modulated on the basis of the number of registered users associated with that other local IP address and actively connected through that other IP address at any given time. Likewise, guests to the first household will also be limited to the access privileges available given the number of first household subscribers currently present at this first household at that time.

In an alternative embodiment, a more globalized local extended home network access privilege management system may be implemented, whereby any subscribed user invoking any of the local extended home network connections associated with the iPCS controller(s) (e.g. iPCS Wi-Nodes) will induce a corresponding incremental network access service enhancement (to a maximum local connection speed available given physical local network capacity). For example, following from the dynamic bandwidth adjustment example described above, a registered iPCS user may connect through a first local residential network connection at home and thus invoke a corresponding subscriber-sponsored bandwidth increase. Upon leaving their home, the user's iPCS-enabled device will migrate to a home or roaming mobile network connection and be subject to applicable data usage charges (e.g. based on actual or effective home or roaming data usages, such as per the MB$ allotment consumption metrics described above) and the available bandwidth associated with the first local home network connection will drop back down to a basic connection level. This same user may then frequent another iPCS-enabled location (a friend's or neighbour's residence, a commercial establishment, their office, etc.) and automatically or manually invoke a local (e.g. Wi-Fi) extended home network connection at this second location. In this example, the iPCS controller(s) will automatically recognize the user as an iPCS subscriber at this second iPCS-associated location and automatically allocate an increased local bandwidth allocation to this second location. In doing so, local extended home network bandwidth allocations may be dynamically modulated across a wide network of local extended home network access points based on actual demand as defined by the number of registered users currently located at any given registered location, thus also promoting that each registered user is consistently provided with reasonable bandwidth wherever they go. This may thus benefit both the registered users and the data network service providers in ensuring that (Internet-on-Demand) services are provided as and wherever needed in a dynamically and self-regulated manner, while further bridging service access across not only local residential/commercial extended home networks but also between local and mobile data networks as well in a seamless or near-seamless manner.

In some embodiments, the SoIP (iPCS) mobile operator may further partner with various public Wi-Fi hotspot network operators to provide their users free access to SoIP services and functions, namely in further extending free extended home network services across a global network of iPCS wi-nodes. For example, a GPS-enabled mobile device may be configured to track a position of the device in real-time and, when approaching or entering an area serviced by a designated public Wi-Fi hotspot network operator, either notify the user accordingly and invite them to switch to Wi-Fi enablement, or again automatically switch to Wi-Fi enablement, thereby effectively providing free SoIP services to the user while operating over such a designated public Wi-Fi hotspot network. To do so, the SoIP service provider need only cross-reference the location of each given SoIP thin client implementation with a list of participating Wi-Fi hotspot access point locations, and provide automatic network access at such hotspot locations upon such given thin client implementation approaching a given hotspot location. In one example, authentication for access to the given hotspot network may be automatically implemented or facilitated by the SoIP thin client. Alternatively, appropriate authentication credentials may be passed along to the user via the thin client implementation for manual processing. Upon detecting a departure from the hotspot location or area, the SoIP thin client may automatically switch back to the mobile data network and resume data consumption tracking.

Figure 20:
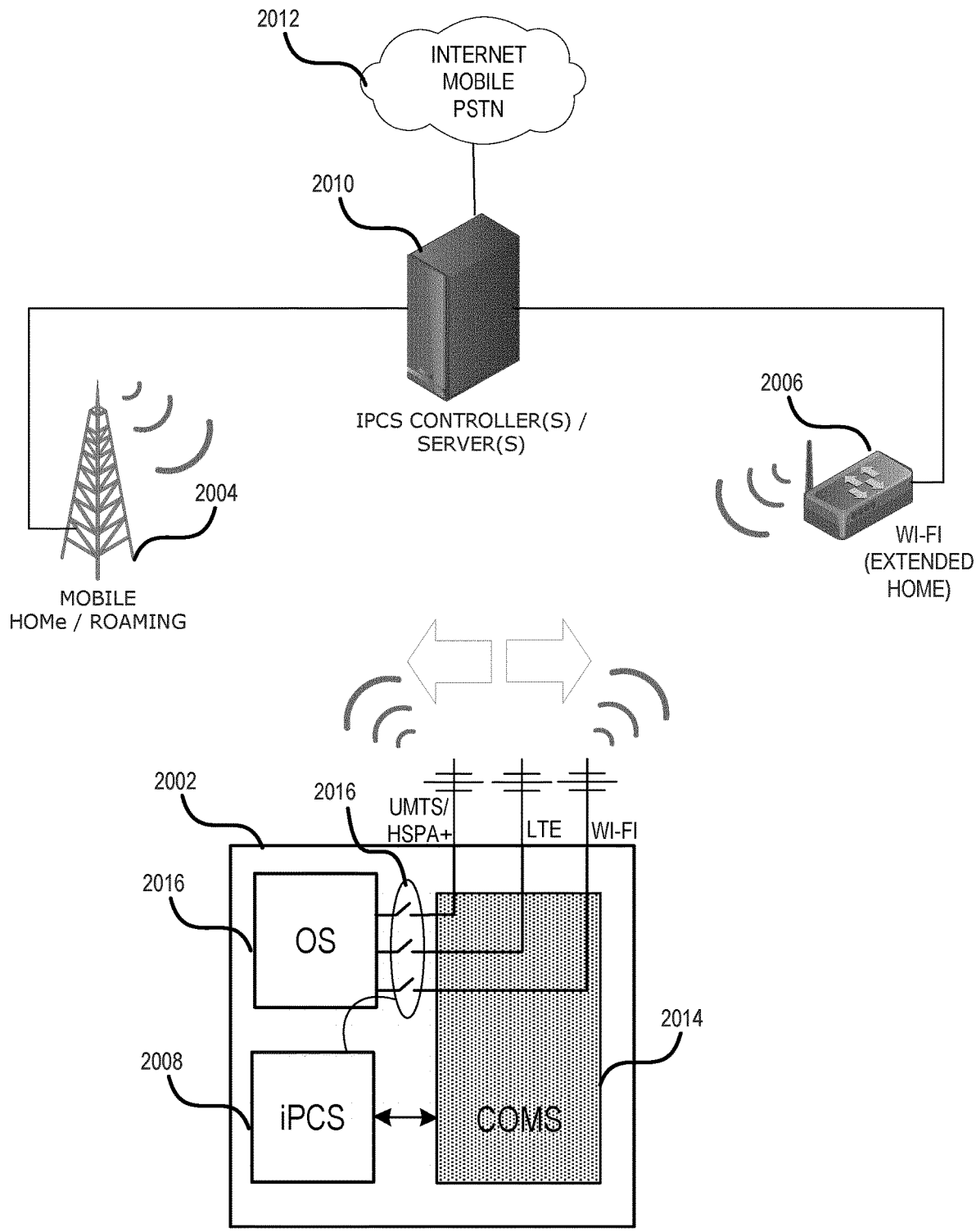
FIG. 20 is a high level diagram of a mobile device as it migrates between a mobile (home/roaming) network and a fixed (extended home) network, in accordance with one embodiment.
Figure 21:
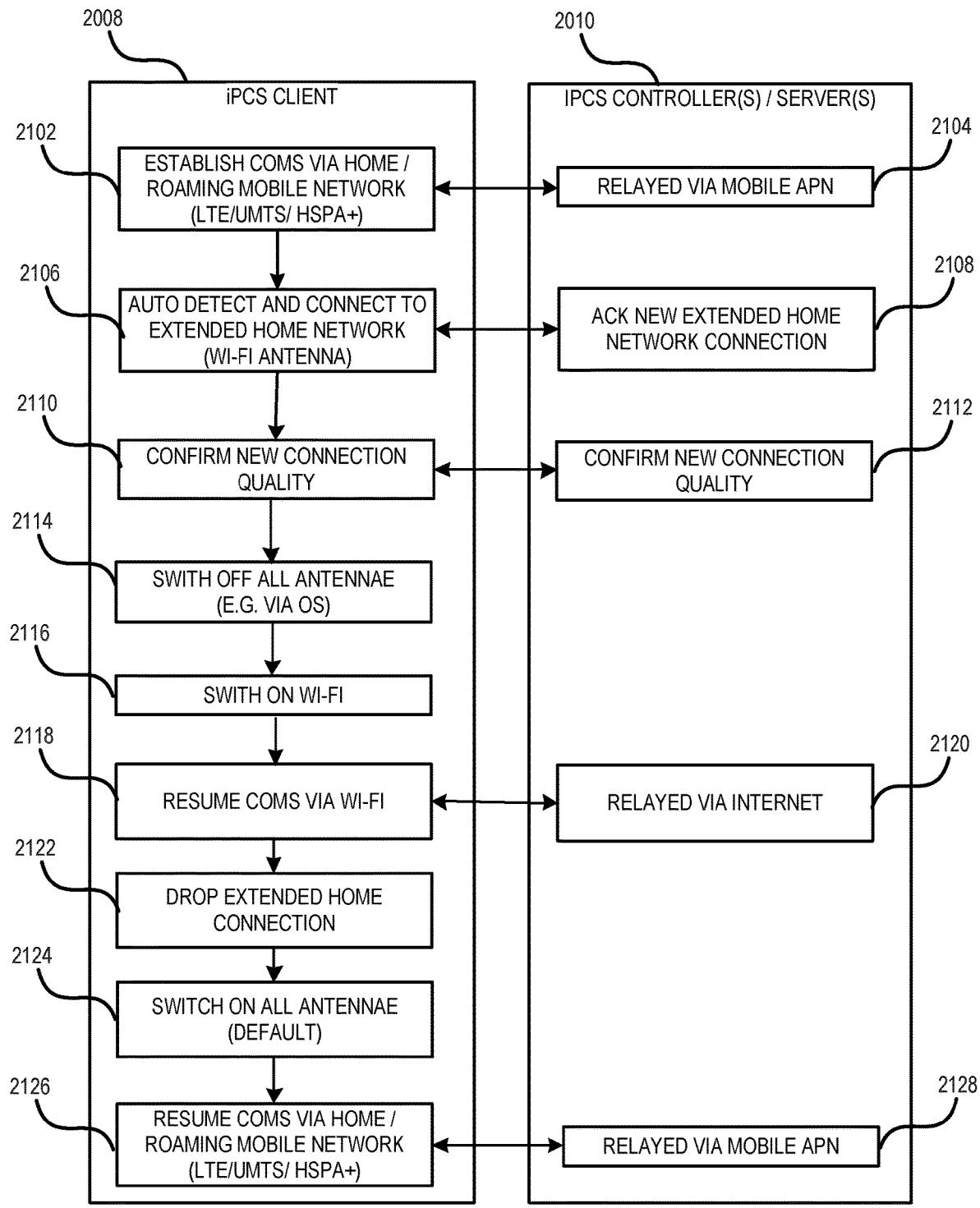
FIG. 21 is a flow diagram of a process for migrating between data network connections, in accordance with one embodiment.

To further illustrate thin client operations in addressing migrations between data networks, reference is now made to FIGS. 20 and 21, in which a mobile device 2002 migrates between a mobile (home/roaming) network 2004 and a local/fixed (extended home residential/commercial/public) network 2006. In doing so, the thin client iPCS application 2008 maintains communications through the iPCS controller(s)/server(s) 2010 to various network services 2012 via the mobile device's communication ports and hardware 2014 irrespective of the underlying communication network, as described above, generally within the context of the registered user's authenticated iPCS profile and session. In order to enhance user services while minimizing service interruptions, battery consumptions, costs and potential network congestion, and potentially optimizing network bandwidth allocations, the thin client application 2008 may be further configured to not only switch communications to a more favourable underlying network, but also switch off unnecessary network connections in doing so.

For example, the iPCS client 2008 may be configured to relay instructions through the mobile operating system (OS, e.g. IOS, Android) 2016 to switch off all mobile connections (e.g. previously established via UMTS/HSPA+ or LTE antennae) upon establishing a satisfactory Wi-Fi connection to Wi-Fi network, e.g. within the context of an extended home residential/commercial/public network connection. In one particular implementation, the iPCS client 2008 can instruct the OS to deactivate all antennae (e.g. via respective hard or soft switches 2018) and then only reactivate a Wi-Fi antenna so to resume communications through the iPCS controller(s)/server(s) via the available extended home network connection. Upon leaving the extended home network coverage, the iPCS application 2008 may automatically return the device 2002 to its default "all" on or hot configuration in which all antennae are automatically reactivated and an available (home/roaming) mobile connection can be re-established and mobile communications resumed (e.g. via the mobile operator APN, as described above).

This particular sequence is further illustrated in FIG. 21, in which the iPCS client 2008 establishes communications via a home or roaming mobile network on LTE/UMTS/HSPA+ at 2102 via relay through the mobile operator's APN at 2104 to the iPCS controller(s)/server(s) 2010, with all device radios being "on" and ready by default. Upon detection of an available extended home network connection (e.g. Wi-Fi) at 2106, the new connection is established and optionally acknowledged by the controller(s) 2010 at 2108. Namely, upon the iPCS application/interface 2008 detecting receipt of a valid public IP address other than that otherwise provide by the system's Gateway GPRS Support Node (GGSN), the application 2008 may proceed with the following network migration sequence.

The quality of the new extended home network connection is optionally evaluated at 2110/2112 for sufficiency (by the client 2008 and/or controller 2010, e.g. in comparison with available mobile network quality), such as by automatically evaluating the latency, packet loss, jitter and bandwidth of the available local connection. As appropriate, all the mobile device radios are deactivated at 2114. The Wi-Fi (in this example) radio is then reactivated at 2116 and communications are resumed via Wi-Fi at 2118 through an Internet-based iPCS controller interface at 2120.

Eventually, the extended home network connection may be dropped at 2122 (e.g. upon the user moving beyond Wi-Fi coverage), at which point the client application 2008 will default the device back to reactivate all antennae at 2124 and resume communications via an available home or roaming mobile data network at 2126, again through the mobile iPCS controller 2010 via the operator's mobile APN 2128.

As will be appreciated by the skilled artisan, by disabling all mobile communication antennas, significant battery power can be saved as can residual bandwidth allocations generally maintained by mobile connections irrespective of data traffic paths. Furthermore, while roaming on a mobile network beyond the mobile operator's network footprint, registered users may benefit from maximising operating times on the system's extended home network coverage rather than to be registered as permanently roaming on the roaming network, a benefit in fact both to the user and the roaming network operator who need not continuously manage the roaming network connection.

Alternative techniques may be considered to toggle active device communications/antennae to achieve a similar effect. For example, in some OS implementations, the client may more directly activate/deactivate certain antennae rather than to proceed with an all-off, single-on, default all-on process. Indirectly, the client application may otherwise disable the device SIM so to indirectly disable mobile communications. As an alternative, the client may otherwise temporarily replace the device's IMSI code to a non valid code, which will also automatically disrupt mobile communications. In each of these, and other examples, a mobile connection to a home or roaming mobile network will be disrupted, thereby ensuring all data communications are directed through the extended home (local/fixed) data network connection.

The above provides for an improved telecommunication architecture that is not bound by wires, location and access points, but rather provides for a potentially simpler, lower cost, one-stop solution. To accommodate data service access across networks, different operational architectures and hierarchies may be implemented, which may involve one or more MNO's and/or VMNO's as noted above, as well as one or more ILEC's and/or CLEC's, either in executing some of the functions and features described above, or in providing the underlying physical and transport architectures on which the IP-based services described above may be implemented.

As described above, the concepts and examples presented herein can shift consumer focus to value added services and away from connectivity as a telecommunications product, but rather as a utility not unlike electricity and water. In doing so, bandwidth (or other throughput) limits can be tied to the type and number of subscribed services so that clients no longer need to estimate their bandwidth (throughput) needs. Likewise, service providers may more readily manage overall bandwidth needs and costs by allocating bandwidth according to actual demand from registered users.

Furthermore, by invoking a possibly global network of available local network access points, a mobile network operator implementing an iPCS platform may drastically increase their AWS spectrum license footprint and thus compete more effectively over large geographical areas and/or across borders. For instance, by offering wireless services to subscribers primarily via operator-provided Internet through Wi-Fi access, the operator can essentially provide primary service through its native network. Customers therefore only "roam" when they leave their Wi-Fi environment (home, office, etc.) and move seamlessly onto a 4G/LTE network. Since iPCS can be implemented to forgo the use of any voice channels and operate exclusively with data, current roaming agreements can allow for the provision of local mobile services in different jurisdictions on that premise.

Traditional residential and business Internet access has been based on subscribers choosing the level of their bandwidth connectivity and the amount of bandwidth consumption (limited or unlimited) on a monthly basis. For this they pay a fixed monthly charge plus consumption overages if appropriate. Supporting the goal of controlling subscriber connectivity, the new strategy described above can consider no-cost access to local Internet when tied to iPCS. Under this approach, local Internet access can be offered at no charge with the purchase of mobile iPCS services. The level of Internet connectivity itself can be tied, as noted above, to the number of mobile devices accessing the Internet through the Wi-Fi Internet connection provided by iPCS.

As an example, if a residential subscriber has one iPCS mobile subscription, they could receive residential Internet service as part of their package and a set amount of 3G/4G/LTE data. iPCS can provide baseline connectivity of 512 Kbps up and down which would be sufficient to maintain simple services such as alarms, ATA connectivity etc. When the iPCS subscriber connects to an iPCS Wi-Fi area, iPCS automatically and seamlessly connects to that Wi-Fi access point and the Internet throttles up to 5 Mbps up and down. Thereafter, for each iPCS device that connects to the iPCS Wi-Fi service, the capacity could increase by 5 Mbps up and down for each additional iPCS user, cumulative up to the circuit capacity of 5, 15, 25, or 100 Mbps, for example. The circuit capacity can be based on expected use of the customer. This "throttling" of bandwidth up and down is controlled by the iPCS platform. Therefore, like a programmable home thermostat, the system only provides local services when users are in their residence (e.g. Internet-on-Demand).

A similar approach can be offered to business clients to create an intimate relationship for clients moving from their residence, to their workplace and back to their residence and in each case, throttling the Internet bandwidth according to the number of attached (Wi-Fi connected) iPCS devices.

In one particular implementation, an iPCS subscriber could thus benefit from: Unlimited Data usage on Wi-Fi;

Unlimited local (i.e. national) Voice calls on Wi-Fi; Unlimited Text on Wi-Fi; Free roaming service worldwide on Wi-Fi; keeping an existing mobile number; and 4G/LTE Data at a given rate per Megabyte.

The following provides various illustrative functions and features rendered available and accessible upon implementing an exemplary embodiment of the mobile operator system, mobile communication device and virtualized smartphone-over-data (SoIP) environment(s)/system/server(s) described above, generically and interchangeably referred to herein as an internet personal communication system (iPCS).

Enhanced Mobile Operator Services and Quality Metrics

As noted above and further described below, the iPCS platform in one embodiment executes a thin client application on all subscriber devices in providing user's virtualized access to the SoIP functions and features supported by the iPCS server(s), network(s) and/or controllers. In executing a virtualized smartphone client on each user device to secure user access to the system's various communication functions and features, the mobile operator in exchange gains further access to the user's mobile device and its operational characteristics and parameters. Namely, as all communicative functions are funneled through the iPCS servers, these servers can discretely access operational and performance data from the device in the background, access heretofore unavailable to mobile operators in general. This access empowers the mobile operator's system operations to conduct further actions on the user's behalf without user input of otherwise remotely unavailable mobile device operational characteristics and parameters, as well as continuously monitor mobile service performance from the perspective of the user, as opposed to solely from the perspective of the mobile device's connection to the network.

Figure 17:
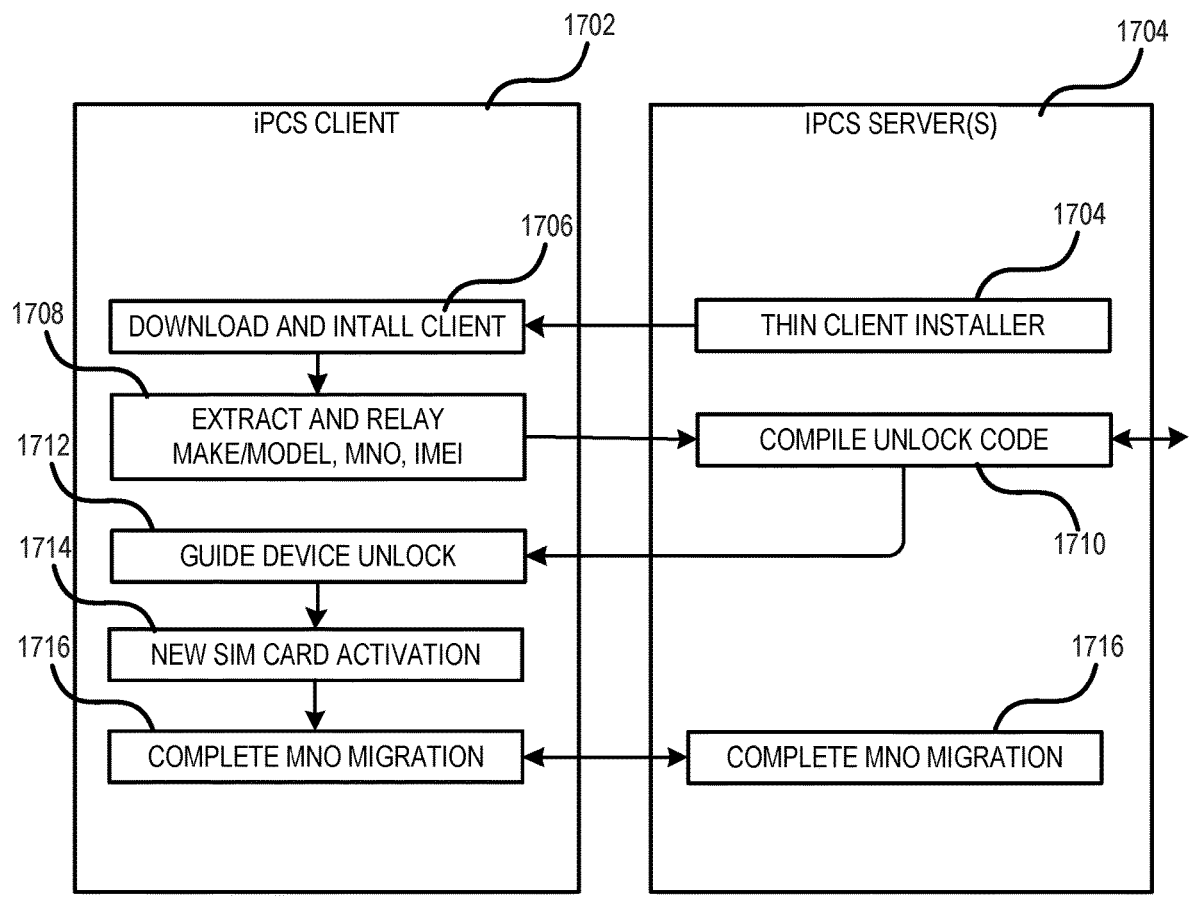
FIGS. 17 and 18 are operative flow diagrams between a mobile device client and a data network service intermediary in which mobile device operating characteristics can be relayed to the intermediary in providing enhanced data network communication and subscriber services.
Figure 18:
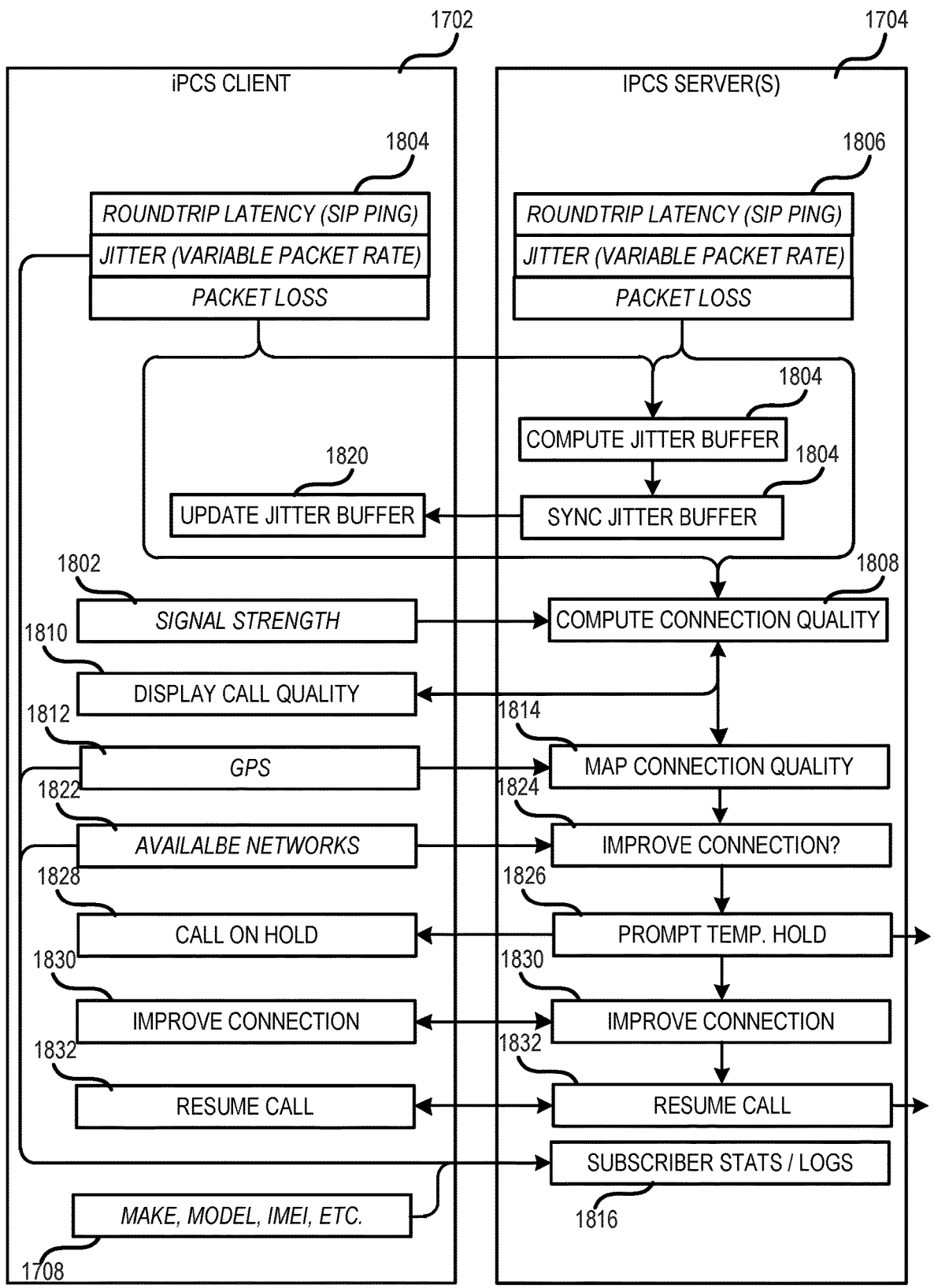

For example, in one embodiment, the thin client application may be configured to automatically or responsively direct all necessary mobile device information to the system server(s) to unlock the device and thereby allow the user to migrate the phone's activation to their mobile operator of choice, namely the iPCS mobile operator. For example, as introduced above and as schematically illustrated in FIG. 17, a user wishing to switch mobile operator will generally acquire a user-agnostic iPCS SIM card to gain direct access to iPCS all-data network services, and prices and/or MB$-mediated exchanges. To do so, the user must first unlock their mobile device, which can require a lengthy call with their current service provider or again a visit to a storefront mobile device unlocking service. Given the virtualized thin client application setup described herein, however, the thin client application, referred to herein by the numeral 1702, may rather operate on the user's mobile device to gather all relevant information required to unlock the phone, and direct that information to the iPCS server(s) 1704 for processing.

Namely, an iPCS thin client installer 1704 may be downloaded or otherwise accessed by the mobile (or other network-ready) device and installed 1706 on the device. Upon first execution post installation, or again within the context of installation, the thin client application may automatically extract all relevant data (1706) required to unlock the device from its current mobile operator. Clearly, a new device previously untethered to an existing mobile operator (e.g. unlocked phone) may skip this process. In one example, the client application 1702 is configured to automatically identify and extract the make, model, IMEI (International Mobile Station Equipment Identity) and current mobile operator from the user's mobile device (e.g. smartphone, cellphone, tablet, etc.) and relay this information to the server 1704 to be used compiling an appropriate unlock code (1708). The person of ordinary skill in the art will understand the steps required in compiling such code, which may be done automatically where direct communicative access is available to the current mobile operator, for example, or with the assistance of a service operator that can operatively compile or otherwise access an appropriate unlock code offline.

In any event, once this information has been processed, an unlock code can be returned to the user's mobile device (1710), for example via text messaging, email or the like, with instructions 1712 as to how to enter that code and ultimately unlock the phone. At that point, the user can replace the existing SIM card with the new user-agnostic iPCS card (1714) and proceed to complete mobile service migration to the iPCS network and platform 1716.

Other information available to the iPCS thin client operating on a user's phone may include, but is not limited to, the brand, make, model and year of the mobile device, the operating system and version, the location (GPS), the name of a Wi-Fi router currently being used or available near the mobile device, etc., all of which can be pushed to the iPCS servers for processing. This information can also be used to direct targeted advertising or promotions to the user via their mobile device, or provide further technical support, for example.

In one embodiment, the thin client application may also participate in the provision of real-time call quality monitoring, both as a means to monitor call quality coverage by location, but also to relay call quality metrics to its users in locally assessing whether perceived call quality lapses are a result of their own reception.

For instance, mobile communications such as mobile voice-over-data exchanges can be subject to variations in call quality due to various parameters, such as signal strength, data packet latency, speed, losses and variable rates resulting in oft times imperceptible, but occasionally significantly disruptive call quality degradation. While traditional mobile devices are provided with a signal strength indicator to reflect a signal strength from a nearest mobile network transmitter, little detail is made available to the user of such mobile device, and even less so to the mobile operator, as to actual call quality at either end of a mobile-initiated and/or terminated voice data call. Furthermore, perturbations in call quality during an ongoing call can generally frustrate participating parties who are left to question the source of the call quality degradations, and even wonder whether a call remains in effect or has been entirely dropped, and when.

As noted above, current device implementations provide a signal strength indicator, which effectively reflects the strength of the signal received at the mobile device. In general terms, the closer the mobile device is to the transmitting tower, and the less interference this signal is exposed to before reaching the mobile device, the stronger the signal, and vice versa. However, even high signal strength signals can be plagued by bad call quality, and vice versa.

In one embodiment, the iPCS application may rather or also include a call quality button or icon that can be selected to view a call quality metric that is actually representative of the call rather than merely of the current signal strength to the nearest tower, for example.

Following from the above example, since the thin client application can monitor various cellular reception quality parameters and push this data to the mobile operator server(s), and vice-versa, both the mobile device and the mobile operator can effectively measure a more accurate call quality metric to be associated with an ongoing call. For example, in addition to measured signal strength 1802, the mobile client 1702 can also monitor data packet-related metrics 1804 such as variable receipt rates (and jitter), missed packets, latency (e.g. round trip latency via SIP Ping Request), and the like, and report this data back to the mobile operator server(s) 1704 via the thin client application 1702, much as the server(s) can monitor inbound packet-related metrics 1806 such as variable receipt rates (jitter), packet loss, latency, and the like received from each mobile device. Performing call quality diagnostics based on sent and received packet rates and missed packets can result in far more illustrative call quality metrics to the user and the mobile operator, irrespective of measured signal strength. Accordingly, the iPCS server(s) 1704 may be configured to combine subscriber-specific client packet-related quality measurements 1804, subscriber-specific server packet-related quality measurements 1806 and optionally a measured signal strength 1802 at the client device to compute a connection quality metric 1808 or the like.

In one embodiment, a call quality scale or display 1810 can be invoked on the thin client application 1702 to report a measured call quality during an ongoing call, for example reporting on a scale of 0 to 10. If a user experiences poor call quality at a particular location despite high signal strength 1802, then this user may move or readjust their position until the call quality metric increases in their favor. Likewise, the mobile operator may log call quality metrics in real-time for each user so to track and map 1814 (using precise mobile device GPS 1812) call quality hotspots and dead zones on a much finer scale (e.g. within 100 m) than previously possible (kilometer range). These logs 1816 can also assist tech support staff pinpoint the source of a user's call quality concerns by comparing various parameters such as call quality, signal strength, network connection and type, user device characteristics such as brand, model, year, operating system, etc., and the like.

Likewise, a user experiencing poor call quality may in fact observe that the call deterioration is occurring at the other end of the call, in that reported packet-level quality metrics are actually fine at their end, but likely disrupted at the other end.

In this context, some embodiments may thus provide a universal monitor for real-time data voice quality, which can benefit the user for direct access, but also as part of customer service logs 1816 that track the start and end time of each call, as well as the call quality 1808 over time which may be affected by switching data networks or network service providers during the call, as described above.

As an example of an applicable mobile operator quality control measure rendered available by the thin client implementation 1702 is the implementation of an adaptive jitter buffer based on real-time latency and packet rate and loss monitoring. For example, traditional systems may be configured with a fixed jitter buffer preset at a given value (e.g. 300 ms) to promote high call quality by minimizing call delay and packet losses. In some systems, a jitter buffer may be set based on a perceived call or connection quality measured at the onset of a call, for example, where call quality and delay is offset by an appropriate buffer given an initial connection quality assessment.

Using the real-time monitoring features of the present disclosure, however, fluctuations in packet rates can be automatically detected and responded to by adjusting the jitter buffer on the fly at the mobile device accordingly. For example, various connection-related parameters 1804, 1806 can be measured by the client 1702 and the server 1704, respectively, and used to compute an appropriate jitter buffer 1816. This computed jitter buffer 1816 is then synchronized (1818) by the sever 1704 with the client device via the thin client application 1702 to update its native jitter buffer (1820). In doing so, the jitter buffer is adaptively set based on both client and server end measurements, and updated dynamically every few seconds or so (e.g. every 5 seconds). As a data connection is continuously maintained between the client application 1702 and server 1704 (e.g. via a distinct or dedicated connection quality management data path or the like), client side and server side data and measurements can be cyclically combined to produce an end-to-end connection quality assessment. Accordingly, as a user moves closer to a given mobile service tower, latency is reduced and the buffer correspondingly adjusted to reduce delay across the call while maintaining packet sequence. Likewise, as the user moves away from the tower, latency may increase and jitter corresponding affected, thus resulting in an adaptive increase in the set jitter buffer value.

As a further example of enhanced mobile operator services rendered possible through such centralized packet delivery monitoring, a call quality monitoring service may be invoked so to actively and automatically monitor a computed call quality metric 1808 for the purposes of automatically identifying poor call quality connections and responding accordingly. For example, in one embodiment, identification of a poor call quality (e.g. where a call quality metric is below a designated threshold) may result in the implementation of quality improvement routine 1824 whereby the server 1704 may automatically investigate whether any other data networks may be available to the user in attempting to improve a quality of an ongoing call. For example, the client application 1702 may routinely push notification of available networks 1822 in their area (e.g. available public or private Wi-Fi networks when actively operating over a mobile data network, or vice-versa). Upon identifying an opportunity to improve the connection (e.g. switch to another data network or communication port, etc.), the server 1704 may automatically prompt 1826 both call parties to identify an observed connection quality concern and put the call on hold 1828 until the issue is resolved. The server 1704 may seek to identify a fix to the call quality concern and execute the fix to improve the connection 1830 with the mobile client before resuming the call (1832).

Accordingly, in the event that a call quality metric dips below a preset threshold, an automated prompt may be invoked to report the poor call quality to each call party. In one embodiment, this prompt may announce a temporary disruption of the call without dropping the call, but avoiding unnecessary attempts by the parties to assess whether the call remains in effect. For instance, a prompt message may instruct each party to "hold the line as the network seeks to address detected connection problems." Upon detecting an improvement in packet delivery, migrating one leg of the call to a new data network connection, channel or port, or implementing other available call quality control measures, the call can be re-established automatically with a reasonable expectation of call quality.

This feature may be particularly helpful in the context of network switches, whereby voice data may be temporarily affected as the mobile device switches from one network to another. In the case of an on-call switch from 4G/3G to Wi-Fi, the transition may be relatively fast will little impact on call quality. On the other hand, a user migrating from Wi-Fi to 4G may experience a temporary lapse in call quality as the mobile device slowly fades out of Wi-Fi range before automatically switching to 4G. In such circumstances, an automated prompt may be invoked at the server to highlight the degradation of call quality and effectively put both parties on hold until the call quality metric is sufficiently improved.

Likewise, where poor call quality is detected, the server may automatically consider other data networks accessible to the mobile device and, as appropriate, incite the establishment of a new data network connection and migration of the ongoing call to this new network connection in improving call quality. For example, a user conducting a call over a Wi-Fi network connection may progressively induce a drop in call quality as they move away from the current wireless access point. The server can detect this drop in quality and automatically invoke a switch to an available mobile network connection, or another available Wi-Fi network connection, so to improve call quality, and that, without user intervention of requiring re-establishment of the call.

SoIP System Security and Confidentiality

As noted above, all relevant iPCS functionality can be configured to reside on the "Cloud", thus turning the Internet enabled device into an access point and control for cloud-based functions, while optionally storing all relevant user data on the cloud independently of the physical device used to access the services. For instance, the only communication device requirement may be that it store and execute an IPCS thin client application to access these cloud-based functionalities. Accordingly, a same subscriber can use multiple devices via a common IPCS subscription to access and/or move all IPCS services from device to device at their choosing by logging out of one device and in to another. Users can log in via the thin client application and have immediate access to all enabled functions including voice, data, telecommunications management, text, browsing and group functions, for example, which enabled functions remain active only so long as the user remains logged into his IPCS account. Likewise, functionality can be added, modified or updated on the Cloud at any time meaning that users do not have to update their device software to benefit from these changes.

Accordingly, the IPCS can provide universal access via a single point of contact, thus providing subscribers with universal access regardless of location or service provider through their IPCS phone number or through their email which is registered on the IPCS system. Therefore an IPCS subscriber can be called or texted anywhere in the world via a single point of contact that is integrated into the service and requires no additional software and login.

Amongst others, this can provide the added benefit of receiving immediate notification of missed calls upon logging back into the iPCS environment, irrespective of the device used to log back in. This is unlike traditional mobile operator systems where a mobile device must be turned on and within a service area to receive such call log information. Likewise, missed text messages will be queued in the iPCS server(s) and notification thereof received by the user immediately upon logging back into the system without delay (i.e. the user will gain immediate remote visualization access to the text message stored on the cloud-based text server).

Furthermore, in the event that a device is lost, there will be no need to remotely "erase phone data". If the user is logged off the mobile device when it is lost, then there is effectively nothing to erase in respect of phone data usage, history, contacts, etc. Where a user loses their mobile device while still logged into the iPCS environment, then one can simply log out remotely and thus block any further access to user data.

While the mobile device is effectively reduced to an access point to iPCS data, the subscriber may nonetheless chose to downloaded this data at any time to their current mobile device. This may include, but is not limited to, subscriber contacts, call listings, text messages, multimedia messages (including any embedded multimedia content), schedules, notes, etc. On the other hand, if IPCS data is not downloaded to the mobile device, upon logging out of the system, there will be no iPCS data on the mobile device's internal memory or SIM card, for example (e.g. contacts, call records, text, browsing history, email). Subscribers can regain access to all IPCS data stored in association with their user profile as such data will automatically sync with the mobile device upon subsequent user login. Therefore users have full access to their data each time they log in regardless of the device.

As introduced above, embodiments of the virtualized SoIP environment and services can provide for enhanced security and privacy, both in respect of user data being securely stored on the iPCS server to limit unintentional access to this data via the user's various mobile devices, as noted above, but also in optionally providing secure communication channels to those users seeking to take advantage of such options. Accordingly, users of the virtualized SoIP environment, and particularly paying subscribers to iPCS services can elect to have all functions including voice and text encrypted, for example, via a 128 bit encryption (private) key. Much as the iPCS environment, the encryption key is not hardware dependent (as in the case of other technologies such as Blackberry Messenger™ which relies on the device PIN) but is based, in this example, on the unique username and password of the iPCS user. Accordingly, the encryption option follows the user from device to device as do the contacts and other information. As the key is known only to the user's device when in use and the iPCS server, transmission and receipt of data to and from the iPCS server is secure. Likewise, when corresponding with other iPCS users having elected the enhanced security option, the transmission and receipt of data such as voice and text information between the iPCS server and such other IPCS user's devices will be equally secured through the recipients' respective unique username and password.

In one embodiment, each user-specific encryption key will be simultaneously generated by the phone and the server when the passphrase is recognized, whereby an illustrative algorithm may be employed on the client and server sides of the virtualized environment to generate a key based on the passphrase for each new session with the server. For example, the encryption key may be changed every session using the same algorithm and combining the passphrase with a date and time associated with each new session that is synchronized between the server and client.

Figure 2:
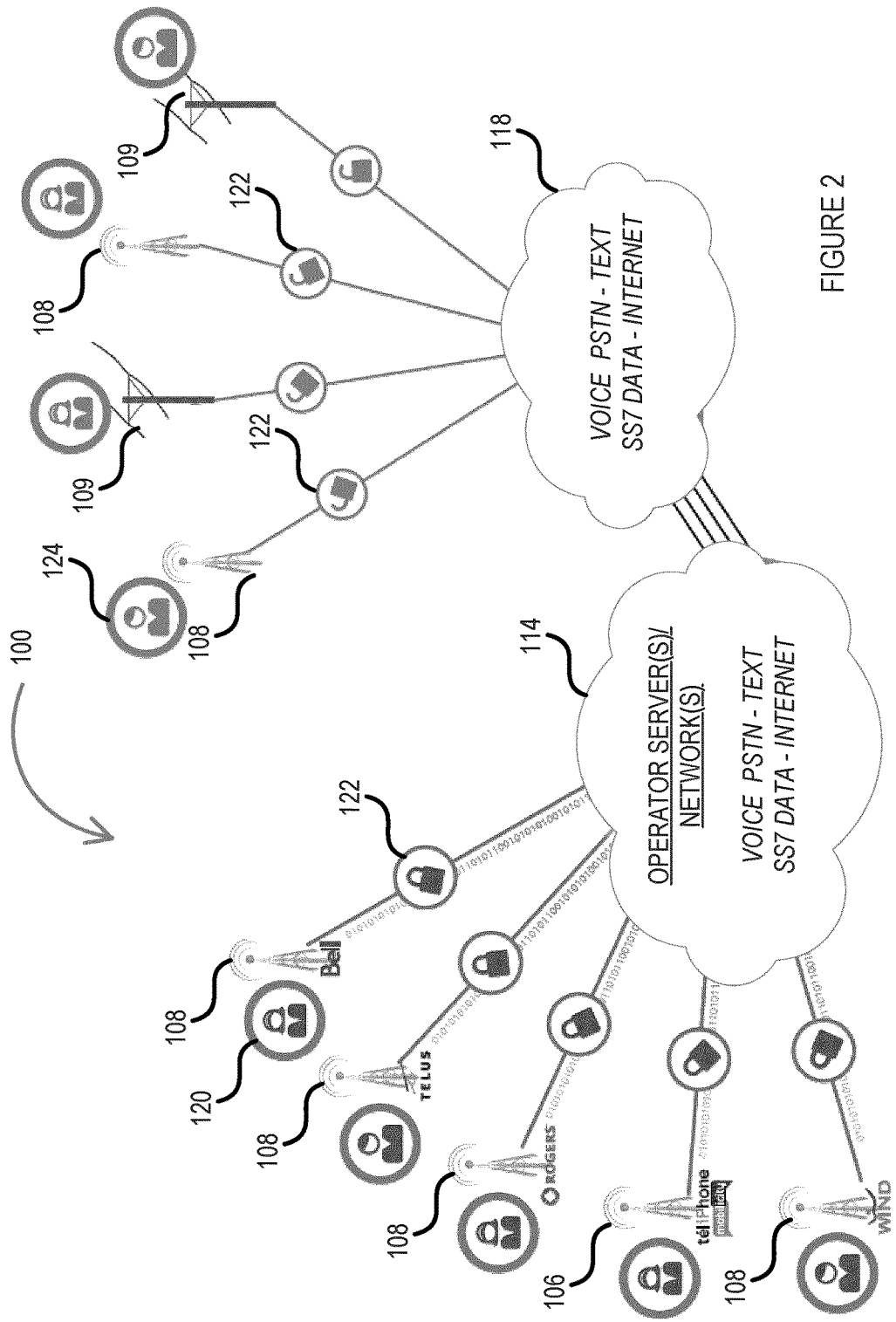
FIG. 2 is a network diagram showing cross-carrier interoperability between subscribers, and between subscribers and non-subscribers to a virtualized smartphone-over-data system and environment, in accordance with one embodiment.

Following from the above, and with reference to FIG. 2, the system 100 may thus be further configured to provide enhanced security for communications exchanged between users of iPCS and its virtualized environment. For example, in one configuration, the mobile operator may provide access to encrypted voice and text-based services to users electing to subscribe to such services, possibly in exchange for a higher subscription fee and included data usage limits given the higher data consumption and processing requirements for encrypted communications. For example, FIG. 2 shows a number of enhanced security subscribers 120 operating registered SoIP-enabled devices over a home iPCS carrier network 106 or a roaming carrier network 108, either way ultimately securely corresponding with one another (e.g. by voice-over-data or SMS-over-data) via respective secure and encrypted connections 122 to the system's server(s) 114. On the other hand, when corresponding with non-secured contacts 124, such as non-users (e.g. subscribers to other mobile operator networks 108 or general PSTN 109 subscribers), or in the example provided below, non-subscribers that may nonetheless use and benefit from the system's SoIP virtualization, while communications between the secured subscribers 120 and the system's server(s) 114 may still be secured by encryption, corresponding communications between the system server(s) 114 and the devices of these non-secured contacts 124 will not be so secured.

As will be described in greater detail below with reference to illustrated examples, in some embodiments, when corresponding with another secured or unsecured user, a corresponding icon or identifier will appear for visualization by the secured user as a notice as to the encryption and security status/level associated with correspondence directed to such secure and unsecure users, respectively. Therefore, when a secured user 120 corresponds with an unsecured recipient 124 (e.g. a non-secured iPCS user or a non-iPCS user altogether), this secured user 120 may deliberately avoid transmitting sensitive information that they would otherwise feel secure in sending to another secured iPCS user. Otherwise, where a given contact includes both secure and non-secure contact coordinates, a secure user may elect to only communicate sensitive information to this given contact via their secure coordinates, and use only their non-secure coordinates for less sensitive correspondence.

Again, for added security and privacy, no texts, call logs etc. ever reside on the mobile device being used via the SoIP virtualization environment unless expressly downloaded thereto by the user. They exist only on the iPCS Cloud. Users can access or delete texts, call logs and other data at any time through an iPCS Cloud Web interface or on their virtualized phone environment when logged in. Therefore on logout, the session ends and there is no data on the phone.

Virtualized SoIP Environment

Following from the previous examples of FIGS. 1 and 2, and in accordance with different embodiments, the mobile communication device 102 will ultimately gain access, post-subscriber authentication, to an operable virtualized smartphone-over-IP (SoIP) environment 200, illustratively depicted by the screenshots of FIGS. 3 to 10. While the SoIP environment 200 may be more commonly deployed to and executed by SoIP carrier subscribers, the SoIP environment may also be downloaded and executed by registered users that subscribe to the mobile services of another native carrier and thus, are subject to carrier service fees and charges associated with that other native carrier. Irrespective, such registered users may still take advantage of the SoIP environment and related features/functions and may eventually seek-out subscription to the SoIP carrier using a registered SoIP carrier device.

Figure 3:
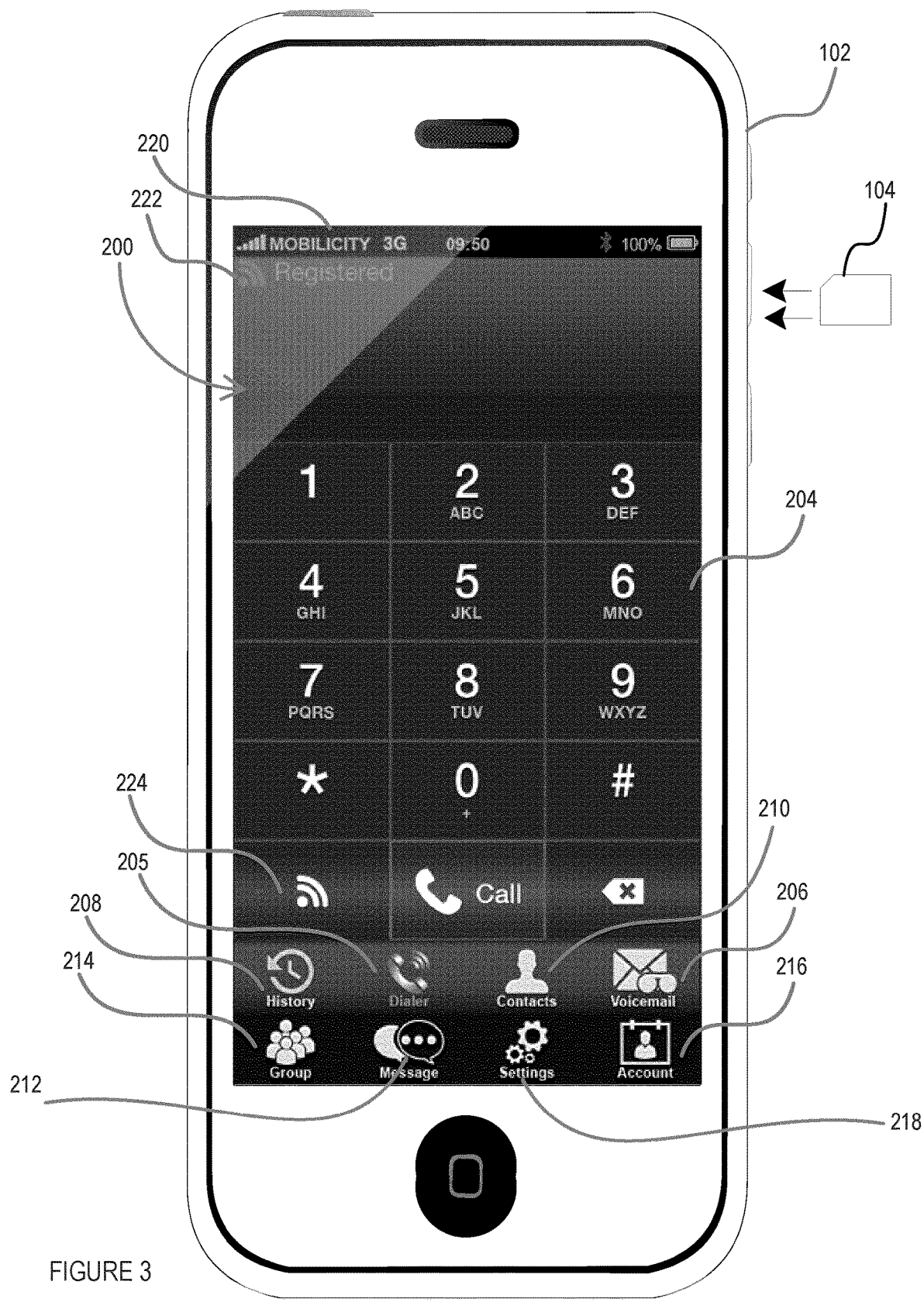
FIG. 3 is a screenshot of a dialer interface rendered on a mobile communication device as part of a virtualized smartphone-over-data environment executed thereon, in accordance with one embodiment.

For example, in the embodiment of FIG. 3, the virtualized environment 200 includes a softphone application 204 emulating one or more mobile telephony functions over the device's native data network and cooperatively operating as a thin client on the mobile device 102 in communication with the system's SoIP server(s) 114. Namely, the softphone application 204 may be centrally implemented on or in association with the SoIP server(s) 114 and provide some of the various features, functions and advantages discussed in greater detail below with reference to various exemplary embodiments.

Beyond voice-over-data call functions (e.g. accessible via single touch dialler function button 205), the illustrative embodiments of FIGS. 3 to 10 provide remote SoIP environment users access to at least one of a centralized voicemail system (e.g. via single touch button 206), a centralized call/SMS history listing (e.g. via single touch button 208), a centralized phone contact listing function (e.g. via single touch button 210), an SMS-over-data or instant messaging IM function (e.g. via single touch button 212), a user group function (e.g. via single touch button 214), a real-time subscriber account information function (e.g. via single touch button 216) and a general settings access function (e.g. via single touch button 218). The environment 200 will also generally show an accessed network identifier 220 (and other connectivity and device operation indicia) identifying the mobile network currently being accessed (e.g. either the subscriber's home mobile operator network or a roaming network accessible by subscribers of the home mobile operator through a pre-established cross-network roaming agreement, and that, irrespective of whether the environment is being executed on a SoIP carrier device or not), and a registered user authentication indicia 222 identifying that the user has been successfully authenticated with the SoIP server(s) 114 as a registered user of the SoIP environment 200.

The SoIP environment 200 also includes, as part of the dialler interface 204, a single touch SoIP environment login/logout button 224, for example allowing users to quickly log-off the SoIP environment and consequently shut-down access to any and all user information on that particular device, which user information will nonetheless remain safely stored on the SoIP server(s) 114 and associated databases and accessible therefrom upon subsequent user login via the same or another SoIP-enabled device. To login, in one embodiment, the user may be directed to a login screen or interface upon launching the SoIP environment, where username and password may be manually entered by the user or automatically unlocked and dispatched via one or more security measures (e.g. biometric or other access security applications). Alternatively, the user may be automatically directed to the softphone interface 204 upon launching the SoIP interface 200, and access a user registration function via the single touch login/logout button 224.

Within this context, while not explicitly illustrated, a same user may readily operate more than one SoIP account with a same device, or even multiple profiles linked with a same SoIP account. For example a user could toggle between accounts using a same device, or again gain access to multiple user profiles from a same account interface. For instance, a user may secure both a business phone number and a personal phone number; actively execute, track, store and log correspondence using each number with respective and potentially overlapping contacts; and manage various user account preferences and features for each profile phone number, which may include user groups, contacts, SMS, call back and auto-reply functions, and the like, all from the same device and SoIP interface. As will be described in further detail below, this user may also allocate different data allotments to each phone number or profile, or again share a same allotment between profiles, which may extend such sharing functionality between grouped users such as within the context of a family or business-wide account, for example.

Figure 4:
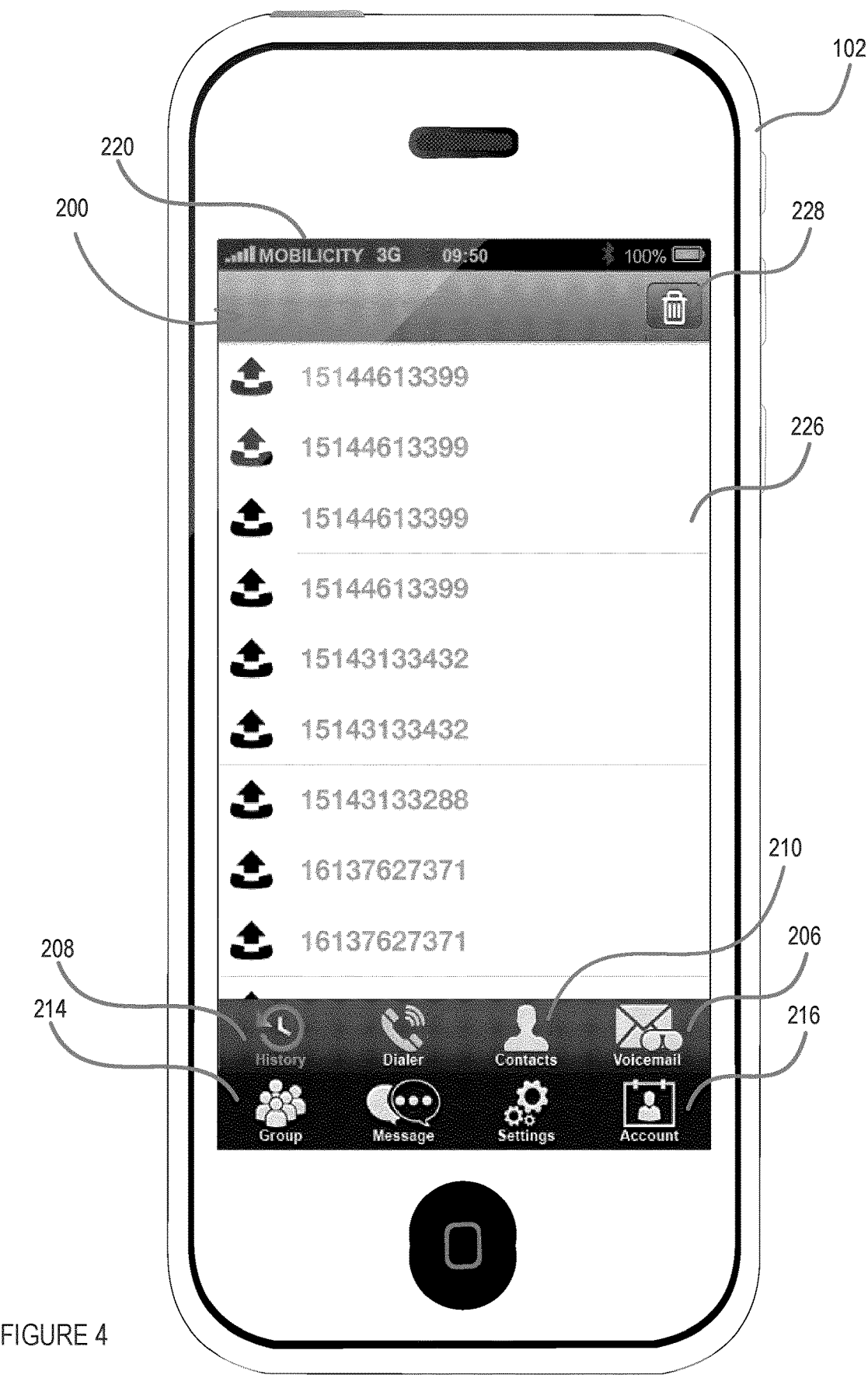
FIG. 4 is a screenshot of a phone history interface rendered on a mobile communication device as part of the virtualized smartphone-over-data environment of FIG. 3, in accordance with one embodiment.

With particular reference to FIG. 4, and in accordance with one embodiment contemplating a single user profile for the sake of simplicity, upon the user successfully logging-in to the SoIP environment, the user may gain access via history button 208 to a cloud-based softphone usage history 226 of all inbound calls received and outbound calls placed via the SoIP environment 200. Unlike a standard smartphone, the call history will remain stored on the system server(s) 114 and can be accessed and managed (e.g. delete entries via trash button 228) via the SoIP environment 200 irrespective of which device is used to gain registered access the SoIP environment 200 and its call history list 226. Furthermore, as the phone log and history is centrally funnelled through, stored on and managed by the SoIP server(s), missed inbound calls and/or SMS messages, as well as recorded voicemail, can be tracked and logged irrespective of whether the user's mobile device is powered, and irrespective of whether the user is currently logged into their SoIP environment and account. Accordingly, unlike traditional mobile telephony configurations where a missed call to a recipient whose mobile device is currently deactivated will go unreported to the recipient, the system architecture(s) and implementation(s) considered herein in accordance with different embodiments allow for all inbound calls, messages (SMS) and voicemail destined for a given SoIP account user to be tracked and logged even when the recipient's SoIP client or device is not currently activated, to be accessed at a later time upon the recipient user logging into their account. Furthermore, as the SoIP servers and functions may be readily accessible via different data network connections including, but not limited to, mobile data network connections, Wi-Fi network connections and/or landline network connections, the SoIP user can centrally access missed calls, messages and voicemails upon reactivating their device and account over any data network connection, and in fact, using any network-connectable device operating the SoIP client.

To illustrate this functionality, the following example is provided for an international traveller who needs international access to their business contacts and correspondence. Using traditional technology, this traveller would carry a smartphone that is generally activated on a home national network and optionally supported by this national network's partner networks and the like when the traveller travels close to home, often paying a premium for broader network access and support, and often suffering from reduced bandwidth and connectivity when operating on partner networks. When this traveller boards a plane, all mobile connectivity is turned off, and missed calls, messages (SMS), etc. that would traditionally be logged on the user's mobile device, go permanently unreported. When the traveller lands, he can access data communications (e-mails stored on an e-mail server, etc.) upon finding a local Wi-Fi hotspot, for example, or upon paying a premium for foreign data network access, particularly if he did not pre-arrange for a travelling data package, but the traveller will not have any access to missed calls, SMS and the like. Generally, international travellers will turn off their data network connection abroad, and minimize mobile telephony traffic to avoid hefty international voice and SMS roaming charges.

In comparison, using the systems and configurations described herein, the SoIP client user will again deactivate mobile network connectivity upon boarding the plane. Irrespective, the SoIP server(s) will continue to log inbound calls and stored inbound SMS and voicemails against the user's SoIP account. Upon reaching his destination, the SoIP traveller can simply reactivate his SoIP account over an available data network to retrieve all missed telephony correspondence from the server(s). Where a free Wi-Fi hotspot is readily available, the user retrieves this information at no cost. Alternatively, the user may take advantage of the SoIP network operator's international roaming agreements to track SoIP data usage in accordance with applicable roaming data usage metrics supplied by the mobile operator. Again, no telephony roaming charges need apply irrespective of where the user operates their SoIP client to retrieve missed correspondence and/or execute new correspondence. Further details on foreign roaming data allocation consumption rates will be discussed below.

Following from the above, and given the centralized cloud-based data-over-IP telephony system architecture considered herein, further benefits and features can be enabled in respect of user's mobile telephony application that were heretofore impossible over existing mobile telephony infrastructure. For instance, not only can SMS messages directed to an offline recipient be stored and later accessed by this recipient when later logging back into their accounts via any live mobile device, such user can also set up an auto-reply function to return an automated SMS message indicating their offline status, but also possibly identify how or when the recipient may otherwise be reached and/or alternative correspondence channels or recipients that can be invoked during the intended recipient's offline status. In yet another example, auto-reply rules may be set based on an incoming number or contact so to not only invoke an auto-reply rule when offline, but to customize such auto-replies based on various parameters such as contact number.

As introduced above, a user operating distinct user profiles from a same device but with different SoIP credentials, for example, may thus invoke different auto-reply functions based on each profile, i.e. responsive to SMS/phone calls directed to different profile-supported phone numbers. For example, a user may manage both a personal account and business account, each one pre-set to send different auto-reply messages when the user is offline. For instance, the user's business-oriented auto-reply message may identify when the user can be reached, and provide alternative business contact details should immediate attention be required and available via one of the user's colleagues or partners. On the other hand, a more casual auto-reply message may be dispatched in respect of the user's personal profile.

Similarly, the user may toggle between accounts, for example predominantly operating a business account during work hours, and a personal account afterhours, whereby auto-reply messages may be set accordingly to trigger "out of office" or "after business hours" messages to clients, partners and colleagues corresponding via a user's business number, while actively responding to personal contacts via the personal number.

Figure 5:
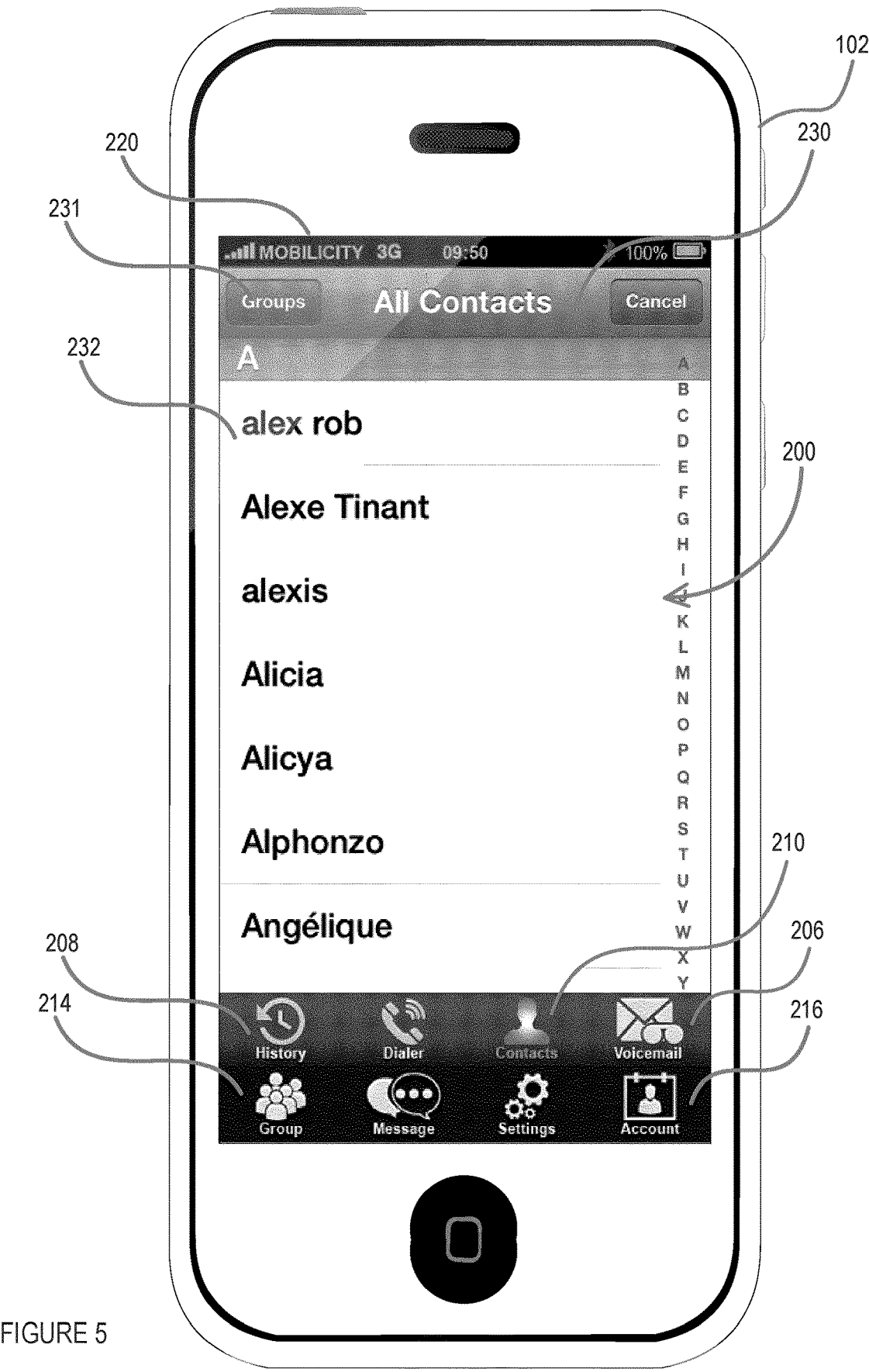
FIG. 5 is a screenshot of a user contacts interface rendered on a mobile communication device as part of the virtualized smartphone-over-data environment of FIG. 3, in accordance with one embodiment.

With particular reference to FIG. 5, and in accordance with one embodiment, upon the user successfully logging-in to the SoIP environment 200, the user may gain access via contacts button 210 to a searchable/scrollable cloud-based All Contacts directory 230, which may include not only entries for contacts that are also users of the SoIP service, but also general contact entries either imported manually or automatically via an associated contacts import function (e.g. an associated SoIP user Web portal function, a device-specific contact transfer function, and automated social-media or mail client contact transfer function, etc.). The cloud-based and maintained contact directory 230, much like the call history log of FIG. 2, will remain stored on the system server(s) 114 and can be accessed and managed via the SoIP environment 200 irrespective of which device is used to gain registered access to the SoIP environment 200 and its contacts directory 226. In this example, the All Contacts interface 230 also provides access to contact Groups via button 231, discussed in greater detail below.

Figure 6:
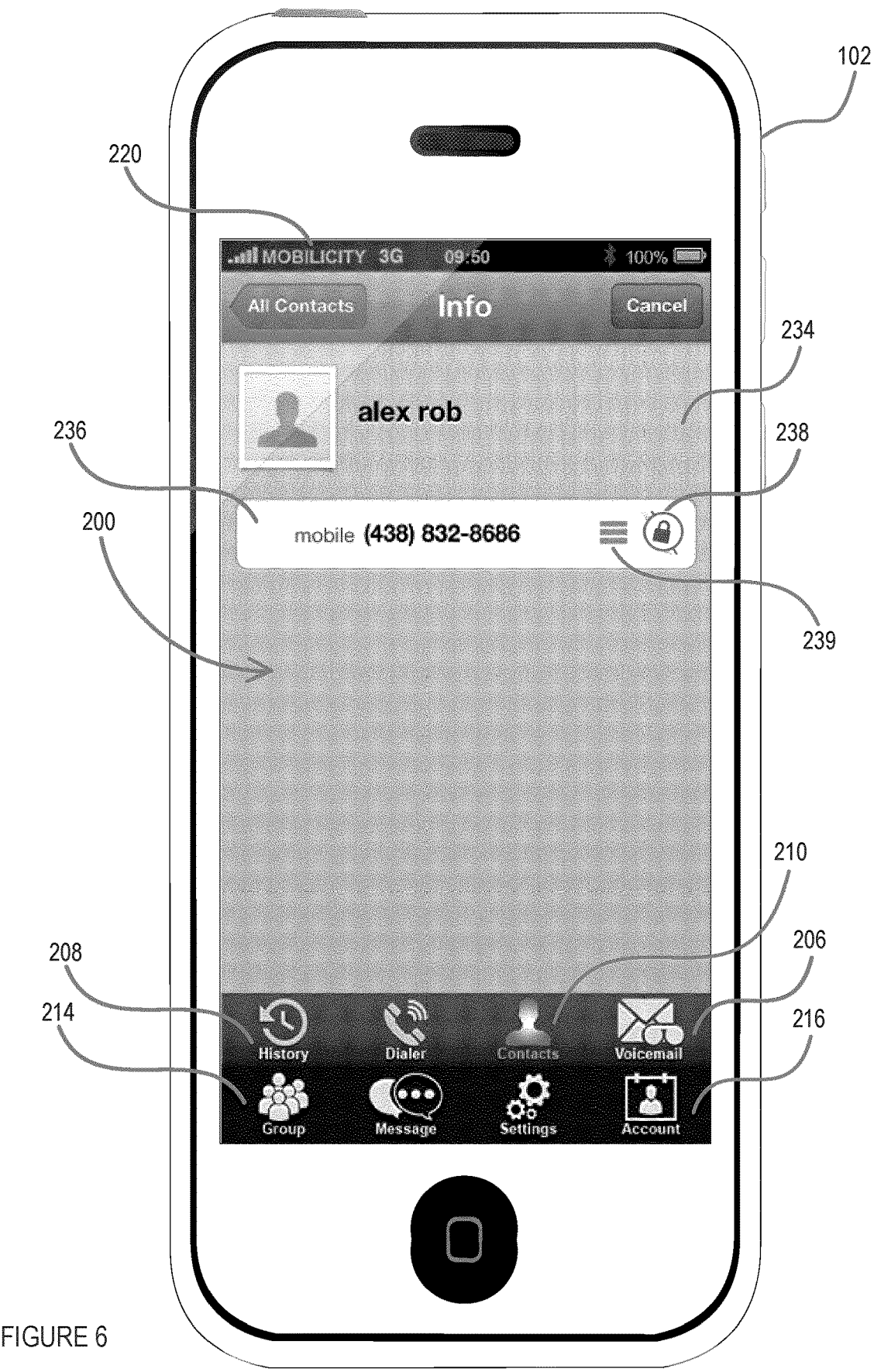
FIG. 6 is a screenshot of a particular contact page of the user contacts interface of FIG. 5 identifying a selected user as also being a secured user of the virtualized smartphone-over-data environment, in accordance with one embodiment.

While logged into the environment 200, the registered user may select a given contact entry, such as by tapping a given entry 232, and gain access to a detailed contact entry 234, shown illustratively on FIG. 6. The user can then select to place a SoIP call directly via the selected contact's mobile phone listing 236, which call will be directed to the called party, first over IP via the SoIP network, and then, depending on whether the contact number in question is assigned to the SoIP carrier or to another carrier, and in the latter case, whether this contact number is nonetheless associated with an SoIP user, over an packet or circuit switched network to the recipient. The SoIP user may also use this interface to automatically select and send an IM/SMS message to the contact, this message being routed, as in the context of a voice call, depending on similar recipient number associations. Traffic routing to and from the SoIP environment will be discussed in greater detail below with reference to FIG. 13, which particularly relates to inbound call/SMS management and routing options in the context of the herein described SoIP environment and supporting native network architecture.

In the particular example, the selected contact is also a registered SoIP user, and thus, can systematically partake in VoIP calls via the SoIP network, and that, irrespective of the device on which this contact is logged into for SoIP services, irrespective of which native network carrier he subscribes to for mobile data network coverage, and irrespective of which mobile data carrier he is currently actively connected to, if not in fact connected through another data connection such as Wi-Fi or broadband Internet, for example. As noted with reference to FIG. 2, this contact's registered SoIP status also allows the registered user in this example, upon subscribing to this feature with the SoIP carrier, to communicate with this particular contact over encrypted sessions on either side of the SoIP server(s) (e.g. via respectively encrypted user-specific sessions using each user's respective passphrase and associated session-specific data). Accordingly, this contact mobile phone entry 236 includes a "secured connection" symbol 238 confirming the security level available upon accessing the contact with this number. In fact, the contact entry could include different phone or SMS contact entries having different applicable security levels. For example, a traditional PSTN home or office phone number may be listed for a given contact and accessible via the SoIP environment 200, albeit at the expense of an otherwise available encryption security should the call be otherwise made to the listed contact's secure mobile SoIP number. Different variations and permutations may also be considered depending on each registered user's subscription package (e.g. selectable encryption package upgrade), available data allotments, etc.

Furthermore, the SoIP environment 200 may be configured so probe the SoIP server(s) 114 to identify if a selected contact and user of the SoIP service is actively logged into his SoIP environment, and if so, if this contact is also labelled as available. In the example of FIG. 6, the selected contact has not only a secured connection icon 238 displayed against the listed mobile SoIP number, but also a green availability indicia 239 identifying the selected contact as online and available. Otherwise, a red indicia may indicate that the selected contact is offline, and a yellow indicia indicate that he is busy (e.g. on another call, or self-labeled as such so not to be disturbed). In these latter cases, the system may then be configured to allow the user to nonetheless leave a voicemail to the selected contact, or again, request that they be notified upon the selected contact becoming available. Again, these features may be seamlessly integrated within the SoIP environment to provide each SoIP user and their SoIP-enabled contacts combined access to enhanced telephony and data communication features and functions otherwise unavailable using standard mobile telephony network architectures.

Figure 7:
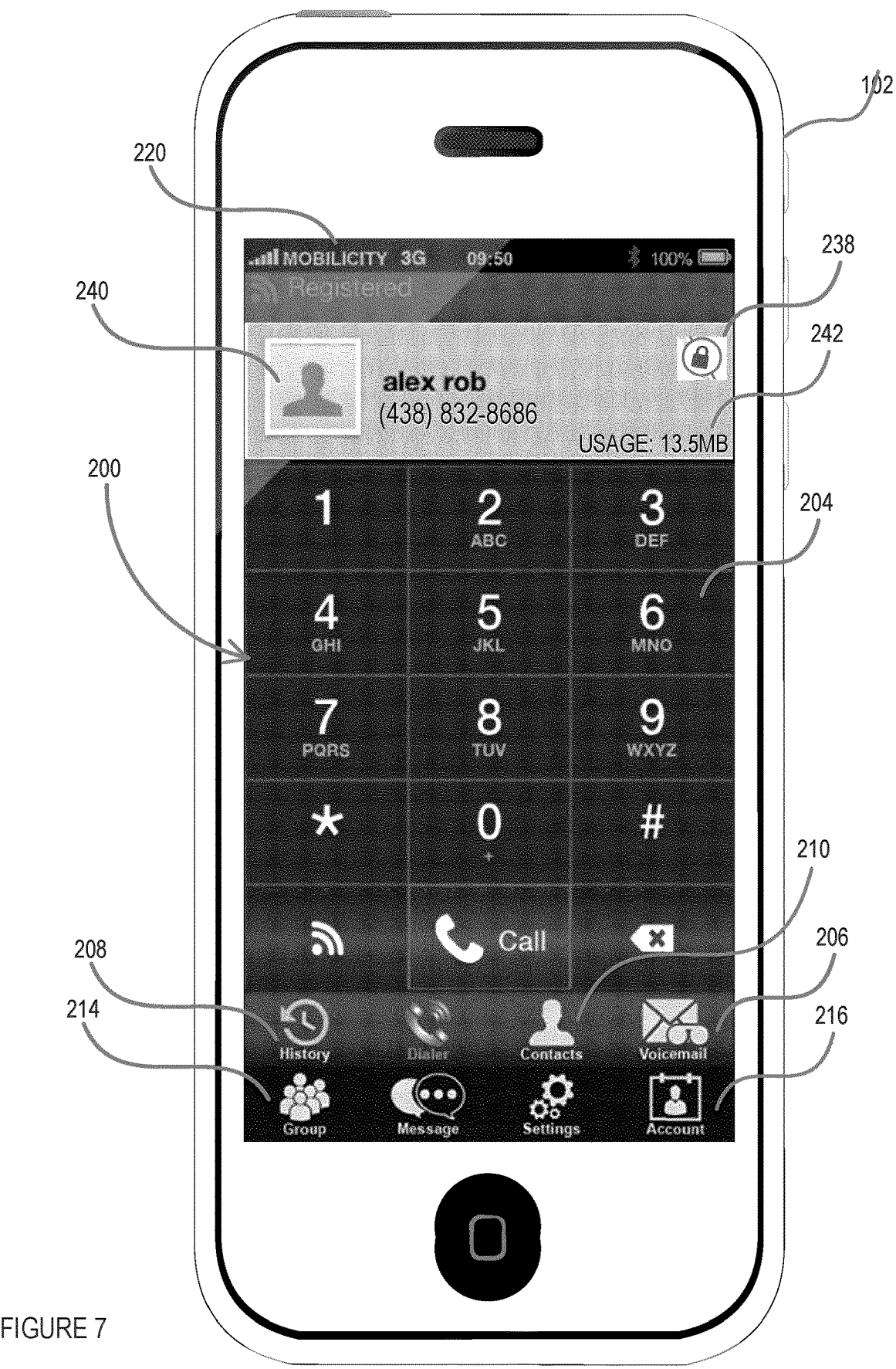
FIG. 7 is another screenshot of the dialer interface of FIG. 3 during an ongoing call to the selected secured user identified in FIG. 6 and showing a cumulative data consumption for the ongoing call, in accordance with one embodiment.

With reference now to FIG. 7, upon placing a call to the selected contact via the identified secure and available SoIP contact number, the registered user is returned to a dynamic rendering of the softphone interface 204 to show the selected contact's details via ongoing call portion 240, which may also show the secure connection symbol 238 confirming end-to-end call encryption, as well as an ongoing data usage metric 242 for the call in progress.

Group/Administrative Functions

The iPCS can provide subscribers and subscriber groups alike with complete real-time control over accessed functions and features, for example, via a complete suite of SoIP management tools as well as available filters and permissions related to calling, texting and browsing, for example.

For instance, the virtualized SoIP environment can provide various features and functions unique to this environment and specific to the formation of user groups and group functions. For example, the SoIP environment can incorporate functions available to uniquely defined user groups of specially connected SoIP subscribers/users that may consist of family/friends in the case of residential users, employees in the case of a company, or other connected individuals (e.g. special interest group, politically affiliated groups, professional groups, etc.). Within these groups, connectivity relationships can be customized to make communication easier and more efficient. Where all members of a particular group subscribe to an enhanced security/encryption service package, intra-group communications can be securely stored and maintained on the system server(s) 114 and encrypted on either side thereof between respective registered user SoIP environments, and again, irrespective of the device being used by each user.

In the context of individual subscribers, a group can be initiated by sending invitations to people they would like in their group (via the invitee's phone number or registered email). Invitees can simply accept or reject the invitation. In the context of corporate subscribers, customized groups can be established as they wish within their corporate environment, and optionally managed via an accessible group administrator portal or account on the SoIP server(s). Other group formation and management functions and features may also be considered, as will be discussed in greater detail below.

Once part of a group, users can gain access to a suite of special connectivity features that can be controlled by the individuals (in the case of residential services) or by a telecom manager in the case of an organization, for example. Since these groups are formed around cloud-based applications, the suite of services can be expanded at any time based on market requirements or trends. Examples of group functions may include, but are not limited to:

Paging: a function that can be enabled for each member of a group whereby a message (e.g. up to 30 seconds) can be sent to an individual or multiple people within the group and automatically broadcast on the recipient speaker.

Push-to-talk: a function that can allow grouped SoIP-enabled devices to operate essentially as walkie-talkies but with enhanced functionality. Under push-to-talk, an iPCS sender can broadcast a message to specific individuals, or groups of individuals, which message broadcasts on a respective recipient device's speaker. Recipients can respond from their device in the same push-to-talk fashion. All recipients are able to hear the response. This is ideal for situations such as dispatch where multiple respondents and direct communications are required, for example. Furthermore, Push-to-talk services are not limited to wireless devices, but may rather work between any SoIP-enabled devices, fixed or mobile.

Figure 8:
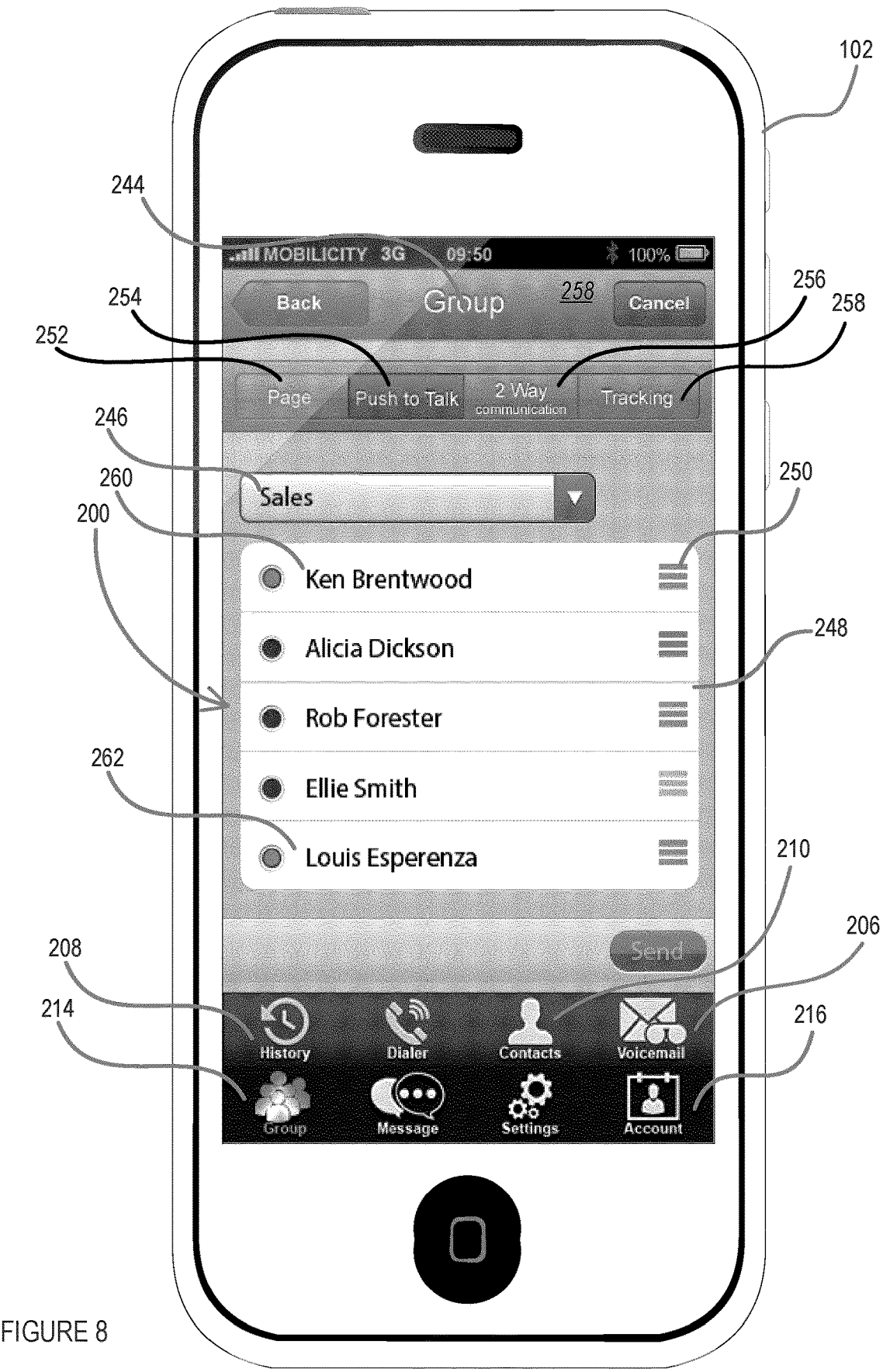
FIG. 8 is a screenshot of a contact group interface rendered on a mobile communication device as part of the virtualized smartphone-over-data environment of FIG. 3 and showing a selected group listing of user contacts and their current availability, in accordance with one embodiment.

With reference to FIG. 8, and following from the example discussed above in accordance with one embodiment, the registered user may gain access, upon logging into the SoIP environment 200, to one or more group function interfaces 244, for example via one touch group button 214 and/or via the All Contacts' group button 231 (FIG. 5). In this example, the registered user can select a particular contact group of interest (e.g. Sales group) using a drop down group menu 246, which then dynamically updates a group contact list portion 248 identifying each user contact belonging to this group. While such list could include non-SoIP user contacts, it is generally contemplated in this example that all contacts forming part of a given group will also be a registered SoIP user, though not necessarily an SoIP carrier subscriber. Accordingly, upon subscribing to the enhanced security option, a group of users may form a secured group whereby all correspondence between this group of users will be encrypted on either side of the SoIP server(s) 114 by respective user-specific and session-specific encryption keys.

Next to each group contact identifier, an availability indicia 250 is also provided, in this example showing a green symbol for users that are logged into their SoIP environment and available, a yellow symbol for users that are logged into their SoIP environment but currently unavailable (e.g. either actively engaged in an SoIP environment exchange or deliberately marked as such to identify that they are currently too busy to receive a call), and a red symbol for users currently "offline", that is, not currently logged to their SoIP environment.

In this example, the contact group interface 244 provides different direct correspondence options between group contacts, such as a paging option 252, a push-to-talk option 254, a 2-way communication option 256 (e.g. VoIP), and a tracking option 258. In the illustrated example, the Push-to-Talk option 252 is selected, and two group contacts 260 and 262 identified as "available" are dynamically selected to participate in this exchange. As a result, the microphone and speaker functions on respective group push-to-talk participants are automatically activated in line with participant actions (speak, listen) so to enable direct and immediate communications between active participants. Again, all exchanges will be fully encrypted, and any tracking thereof will be exclusive stored and maintained on, and later accessible from, a cloud-based repository, unless of course otherwise downloaded to a particular device when allowed under user/group/administrator settings.

As noted above, the SoIP service may also allow individuals, groups and administrative users to customize service access permissions and restrictions, and/or gather informative user access metrics and information, as well as enable and/or manage various group or inter-user functions such as data allocation sharing and/or exchange; referral incentive, tracking and compensation; and the like. This may be particularly attractive to enterprise users in seeking to maintain some control and understanding as to how enterprise devices are used by their employees/members.

For example, a user or group manager may invoke certain telecommunications management tools via an administrative SoIP environment interface and/or via a Web portal to the system's server(s) 114, whereby a managing user can oversee and control device/subscription usage permissions/restrictions and have access to comprehensive real time usage data. In an organization, devices/subscriptions can be managed as a group or individually. In some examples, iPCS may incorporate user-driven real-time controls over all or most functions and features. This may allow users to customize their telecommunications experience to their specific needs at any given time and to program the functionalities for unattended control.

Examples of call management functions accessible to individuals, groups and/or managers through the iPCS administrative and/or Web interface may include, but are not limited to:

- Time of day permissions/restrictions (when calls can be sent/received);
- Long distance permissions/restrictions (where calls can be placed);
- Call Filtering (block numbers in or out);
- Simultaneous ring function controlling which mobile phone will ring when a specific number is called (e.g. where a same subscription phone number is shared over multiple devices or between group users that may be concurrently logged into to SoIP system), which can be programmed by day and time of day, for example. Accordingly, different devices may ring depending on whether it is normal or after business hours, or again, in the case of a support line, a single number can be set to ring on several devices at once (e.g. multiple active SoIP environments);
- Call Forwarding, whereby a call is automatically forwarded to another number or numbers, and can again be controlled by day and/or time of day;
- Cascading Functions, whereby a call can be automatically forwarded to a defined sequence of numbers if the call is not answered;
- Phone Activation/Deactivation, whereby a particular user access to the SoIP environment can be activated or deactivated automatically according to a preprogrammed schedule (e.g. day and/or time of day), or again remotely;
- 4 digit access and transfer, whereby SoIP-enabled devices within a same organization regardless of location can be accessed internally by dialing a 4 digit extension, or again transferred using this same 4 digit access; and
- Do not Disturb, whereby a particular user's SoIP-enabled device may be set to identify days and/or times of day when a phone will ring or receive other notifications via their enabled SoIP environment.

Examples of text-based or multimedia messaging management functions accessible to individuals (e.g. parents), groups and/or managers through the iPCS administrative interface and/or Web portal may include, but are not limited to:

- Day and/or time of day texting permissions/restrictions;
    - Content filtering, for example consisting of an intelligent filtering algorithm which blocks and reports inappropriate messages between registered users; and
    - Received and read functions.

Examples of browsing management functions accessible to individuals (e.g. parents), groups and/or managers through the iPCS administrative interface and/or Web portal may include, but are not limited to:

Day and/or time of day browsing permissions/restrictions;
Content filtering for inappropriate content;
Website-specific or application-specific filters to block specific web sites or platforms (e.g. select social networking sites, YouTube™, etc.)

Examples of real-time or historical usage management (e.g. statistics) accessible to individuals (e.g. parents), groups and/or managers through the iPCS administrative interface and/or Web portal may include, but are not limited to:
Data usage/Data remaining;
Call records;
Text entries;
Web page history; and
Current users online.
Other features and options may also be considered.

Network Subscription Metrics

As noted above, iPCS allows for the combination of traditional telephony features and functionality (e.g. voice and text) with traditional mobile data services under a common mobile data service plan. By using an IP-only approach for all functions and features, no voice channels are used or needed, thus simplifying usage metrics and native carrier subscription packages, not to mention reduce applicable fees, particularly when roaming. For instance, native carrier subscription packages can be set and managed on a "per megabyte" basis whereby users purchase megabytes (either prepaid, post-paid or based on certain package amounts), and consumes these megabytes over time at a rate that will depend on the specific application at hand. Therefore, megabytes become the "currency" of iPCS, as opposed to traditional methods that also necessarily exchange in minutes, sent/received text messages, etc. For example, using current iPCS standards, 1 MB of data usage can provide approximately 9 minutes of voice calling, 90 text messages, or 4 Webpages (bearing in mind that Internet browsing will consume at a variable rate according to the nature of the content being browsed—e.g. text vs. graphics vs. multimedia vs. HD multimedia). By monitoring or estimating subscriber usages, one may allocate or budget a particular amount of MBs per month and select an appropriate service package accordingly. FIG. 11 provides an example of different iPCS service subscription packages that may be offered, and the level of usage that may be afforded to subscribers on these subscription packages, whereas FIG. 12 provides a list of features/functions available under each subscription package, including that available to non-native users (e.g. those subscribed to another native carrier but registered to use the SoIP environment). Clearly, other subscription packages, features and/or functions may be considered in different embodiments without departing from the general scope and nature of the present disclosure.

For instance, registered iPCS users operating on another mobile operator's network may also benefit from the various advantages of iPCS, but will be subject to the data plan charges and allocations provided by their native mobile carrier. In one embodiment, such non-native users may be provided free access to iPCS services, not only to encourage loyalty transfer to the iPCS mobile operator, but also to enhance security and versatility options for existing iPCS mobile operator subscribers in providing them access to a greater pool of iPCS users in their contact list.

iPCS can also service its subscribers irrespective of the device they are using, such that any Internet-enabled device with multimedia capability (microphone, speaker, interactive screen via touch or mouse) can effectively become a virtualized smartphone upon accessing an authenticated data network connection (e.g. landline (Ethernet), wireless (Wi-Fi) and/or mobile (cellular)) to the IPCS server. Accordingly, complete roaming and portability is provided, particularly for users of mobile communication devices that can access the Internet via the iPCS mobile operator's data services (or that of another mobile operator under a separate data plan) via a home or roaming mobile network, as well as via other wireless services such as Wi-Fi or Ethernet.

The iPCS also allows for real time subscriber access to a unitary data consumption measure covering all data usages irrespective of the application (VoIP, text-over-IP, Internet browsing, email, etc.). In one example, a current data usage and account balance is made available to the subscriber in real time via the thin client SoIP environment. This may include general information such as overall and/or function-specific data consumption, as well as predictive measures for remaining data allotments, extra data purchase options, and data transfer options to other users, for example.

Figure 9:
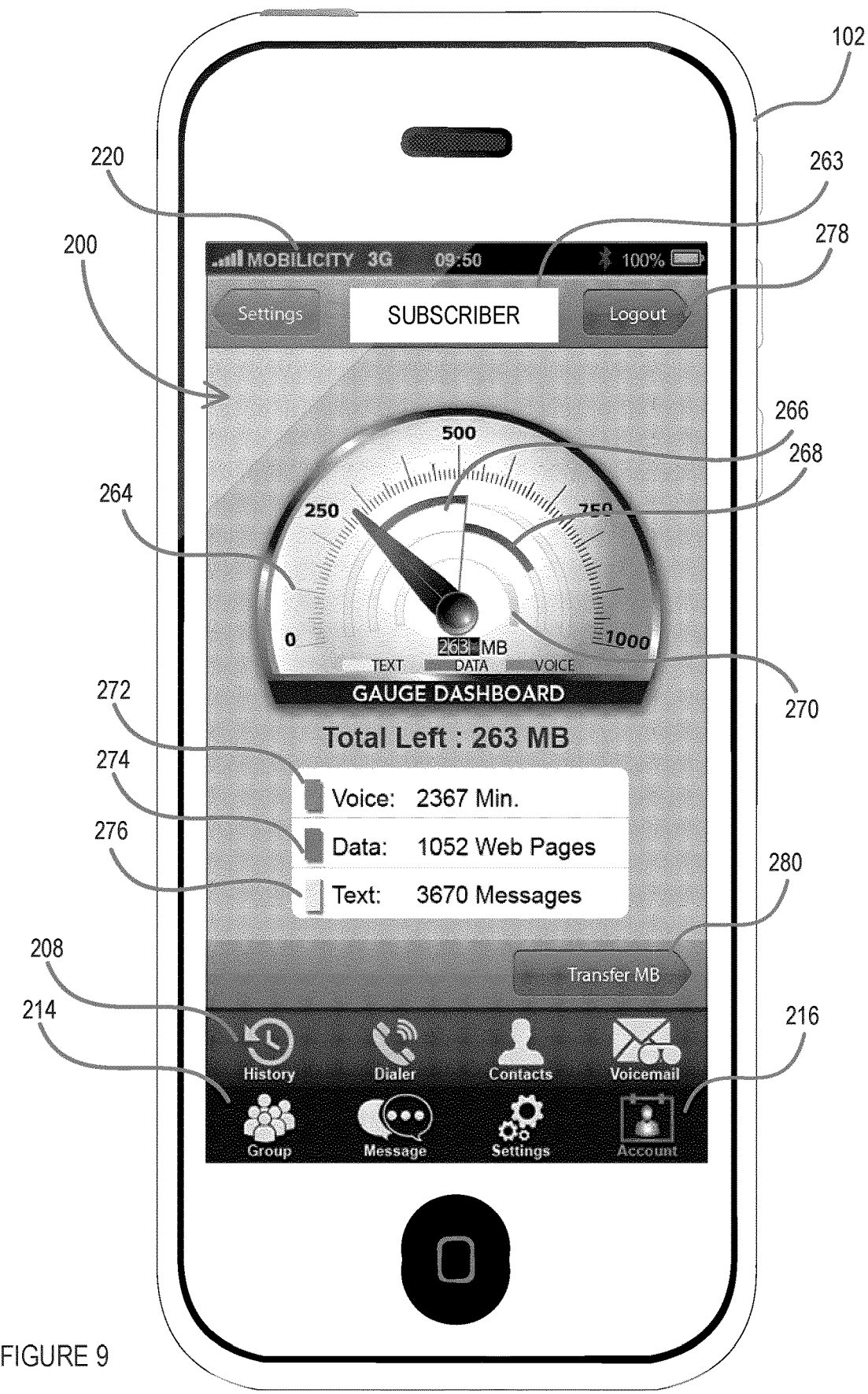
FIG. 9 is a screenshot of a user account interface rendered on a mobile communication device as part of the virtualized smartphone-over-data environment of FIG. 3 showing a remaining data allocation in the user account, in accordance with one embodiment.

With reference to FIG. 9, and in accordance with one embodiment following from previous examples, upon a registered user successfully logging-in to the SoIP environment 200, the user may gain access via account button 216 to a subscriber account interface 263 and various subscriber-account functions. In the particular example of FIG. 9, the user is first presented with an up-to-date graphical data-usage indicator 264 that shows a current data consumption relative to an overall subscription allocation (e.g. 737 MB used and 263 MB left out of a total monthly data allocation of 1 GB), and further graphically illustrates a respective colour-coded portion of this consumed data associated with each of voice 266, data 268 and text services 270, along with a specific number of minutes 272, Web Pages 274 and Text Messages 276 associated with each consumed portion. The subscriber can then accurately observe consumption trends and predict future usage requirements, and adjust the subscription package accordingly, not to mention appreciate the overall benefits of an all-over-IP subscription package over traditional mobile telephony packages.

In accordance with one embodiment, while not explicitly shown in this example, a data-usage indicator 264 may further display relative data consumption metrics relevant when the user is roaming abroad, for example, outside their home country or region, that is outside a general home jurisdiction or network where their account is predominantly active or originated. For example, in conventional mobile systems, a user of a North American mobile phone that operates this phone in Europe, for example, will be subject to international roaming charges that represent significant increases in per-minute airtime charges, for example. While such user may investigate applicable international roaming charges before or during travel via the mobile operators Website, contract or general terms and conditions, the user is generally blind to these charges until they receive their monthly bill from their home mobile operator. Generally, the foreign mobile operator will not bill the home mobile operator for the users' foreign telephony usage until later (e.g. a few days or even weeks later), which is then converted into a home operator charge on the user's mobile phone bill.

To follow from the international traveller example provided above, the traditional smartphone user can either pre-purchase an international mobile telephony and/or data plan for a given destination (e.g. country by country), or be subject to international roaming charges (variable country to country) that they may only be fully made aware of at the end of the month when they receive their mobile phone bill. While travel packages may be practical in some scenarios, particularly where a traveller will be travelling or staying within a given area or country for an extended period of time, it provides little benefit to the corporate traveller who may visit multiple countries in the same month or even week and would get little benefit to purchasing multiple travel packs to cover each and every country. Furthermore, the traveller will have no real-time access to foreign data consumptions until they receive their monthly bill, possibly showing that they have only used a fraction of the allotted foreign data, the remaining fraction of which becoming unusable unless the traveller returns to that jurisdiction within a limited timeframe.

In comparison, the SoIP business traveller can significantly benefit from the all-data server mediated SoIP data plan available in the present context. First, this user need not be concerned with prohibitive international mobile telephony roaming charges, requiring only data roaming to navigate all SoIP functions and features. Given pre-established SoIP mobile network operator data roaming agreements with foreign mobile network operators, the SoIP mobile operator can provide preset data roaming metrics to its users, much like current mobile telephony operators can disclose foreign telephony roaming rates to their clients. However, as all SoIP communications are communicated over data via the SoIP mobile operator APN, the SoIP mobile operator gains real-time access to the SoIP user's data consumption, and thus, can immediately report on such consumption via the user's thin client interface.

In the context of the illustrative GUI of FIG. 9, a SoIP user could still operate on the basis of a preset monthly data allocation irrespective of whether they are travelling locally or abroad. Upon travelling abroad, however, as all inbound and outbound data funnels through the SoIP operator APN, the SoIP data servers can automatically identify a location of the user, and an appropriate data consumption rate metric can be automatically published to the user via the GUI of FIG. 9 to indicate that they are consuming data allocation at a higher rate. For example, a Canadian could have a 2:1 data consumption rate applied to their account while travelling in the UK, while having a 4:1 consumption rate applied while travelling in Spain, for example. Such conversions and consumptions can be seamlessly applied to the user as they travel, and reported back to them via the GUI in real-time. The user can then simply chose to purchase a larger data plan when travelling abroad, or on the fly as they observe their monthly data allocation drop at a higher pace when travelling in certain jurisdictions.

In the context of a group administrator portal, a similar display may be provided for group-wide usage, for example where a group data allotment can be shared between users of a same enterprise group or the like. Such shared group resources could also be broken down based on each user's personal consumption, and respectively broken down into distinct service usage.

Figure 10:
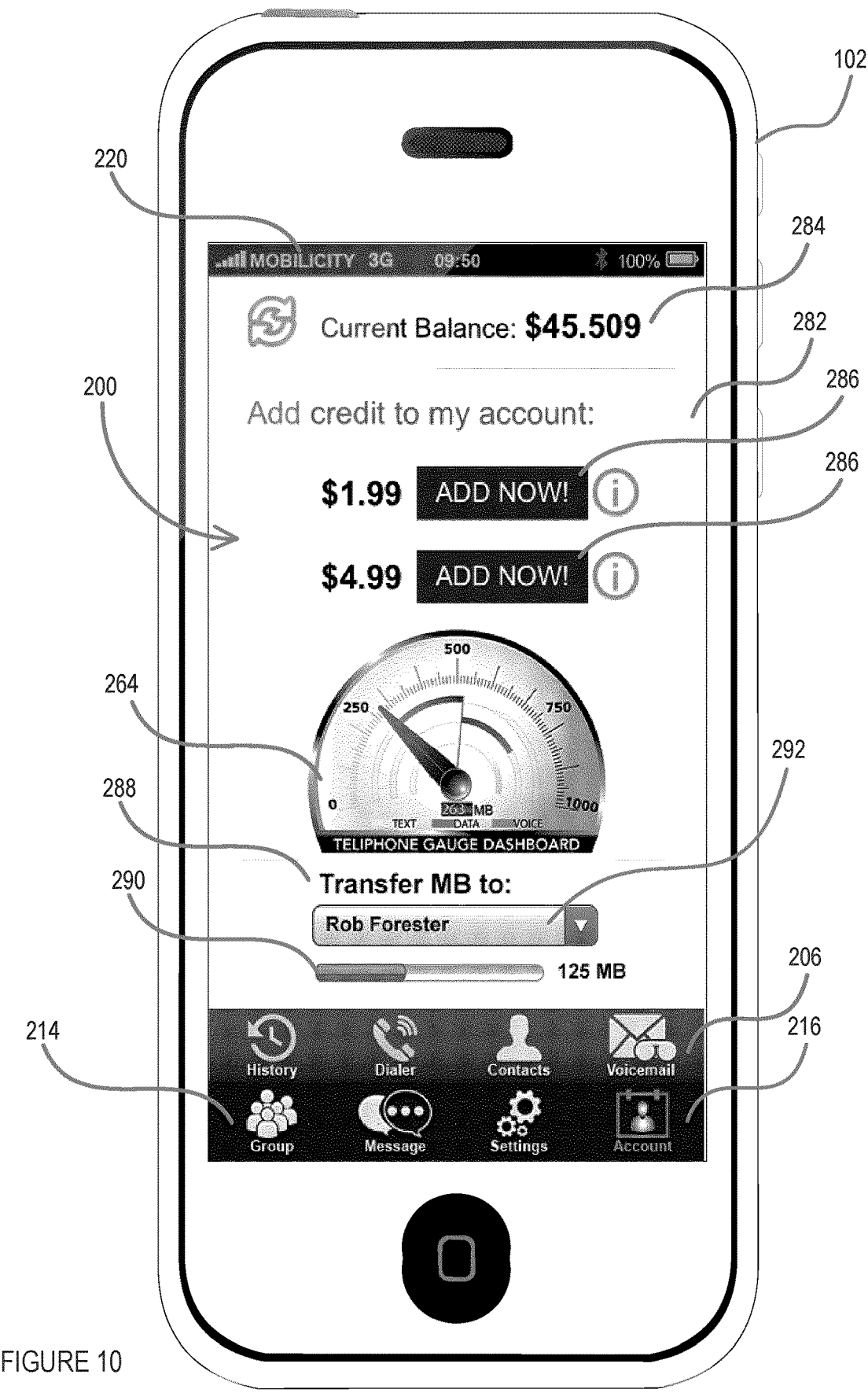
FIG. 10 is a screenshot of another user account interface rendered on a mobile communication device as part of the virtualized smartphone-over-data environment of FIG. 3 showing data allocation add-on and transfer options, in accordance with one embodiment.

In the present example, the subscriber interface 263 includes a logout button 278 to log out of the SoIP environment on that device, as well as a Transfer MB button 280 leading the subscriber to a data Purchase/Transfer interface 282, shown illustratively in FIG. 10.

With reference to FIG. 10, the data purchase/transfer interface 282 reprises the graphical data consumption graphic 264 of the previous interface, and adds a real-time or refreshable current monetary balance in the account 284, and two one-touch options 286 to add further data credits to the subscription for the month in progress. This interface also includes a MB transfer function portion 288 that includes a present or dynamic drag-selectable MB transfer amount function 290 to identify an amount of MB to be transferred (for example relative to an overall monthly allotment), and a drop-down menu function 292 allowing selection of a particular data recipient subscriber from a list of known subscribers (e.g. defined by the user's membership to a particular user group or groups of subscribers, such as linked family members, business partners and/or employees under an enterprise group setting). Once the amount and recipient subscriber has been selected, the transferring subscriber may activate the transfer and inject the transferred data allotment in the recipient's account.

Unlike a monetary transfer function, both the transferring subscriber and the recipient can accurately predict the relevance and impact of the transferred data allotment, both relative to each subscriber's current data usage and in respect of an expressed need for added data access. For example, a subscriber wishing to correspond with another subscriber may elect to transfer a certain data allotment thereto prior to or after placing a voice call in order to mitigate an impact this voice call may have on the called parties subscription package. This may also be relevant where a given subscriber predicts a substantial data overage for the month in progress and requests a friendly transfer from someone underusing their subscription package (e.g. from a friend, colleague or family member that is on vacation and thus making limited use of their current subscription, for example).

In one particular embodiment, data allotment transfer functions may be implemented within the larger context of a mobile data access distribution system and method, whereby registered or authorized dealers may be enabled to purchase or otherwise acquire large mobile data access packages at wholesale prices for distribution or resale for profit. For example, an authorized distributor or reseller, could acquire a 100 GB data package at a reduced rate (e.g. 4.5 cents/MB), and sell portions of this package over time to different system users/subscribers for profit, (e.g. 7.5 cents/MB). By distributing and decentralizing the sale of data packages via the thin client transfer function described above, or a variant thereof, the sale of data access privileges may be more readily distributed than otherwise available via current prepaid mobile service card options, or the like. Namely, the point-of-sale (POS) for these data allotments then becomes the reseller's own mobile device, or in fact, his authenticated virtualized SoIP interface implemented on any suitable mobile device, rather than invoking respective POS terminals, accounting, access card replenishment, cash handling, and the like. As will be appreciated by the skilled artisan, as most prepaid mobile phone card transactions are still committed using cash, this improvement alone of facilitating mobile-to-mobile data allotment transfers, optionally in exchange for an integrated or verifiable electronic payment transaction without the use of cash and/or hardcopy mobile access cards, circumvents many of the drawbacks of standard mobile payment options.

In one particular embodiment, the SoIP environment is further designed to accommodate the implementation of an authorized aftermarket platform, whereby an authorized user can apply and be credited with an aftermarket license to buy and resell data allotments for profit. In some configurations, resale margins may be dictated by the originating mobile operator, for example based on jurisdiction, type of aftermarket reseller (individual vs. commercial establishment), and the like. In other configurations, the reseller may be provided with the option to chose their own profit margins, for example based on their own wholesale costs, or again, on various market conditions such as general availability, market reach, reliability, etc.

In one exemplary implementation, a reseller could get a request for a data allotment of a given size, upon confirming availability and payment options (e.g. direct cash payment, e-transfer, PayPal, etc.), the buyer could confirm the payment transaction to the reseller who could then in turn execute the data allotment transfer. Defaulting on a particular sale could have the reseller's license revoked, for example provide some security to the buyer. In other configurations, the data allotment and financial transfer functions may be integrated for co-execution within the context of the thin client application at both ends, thus providing enhanced security.

The SoIP environment, or related Web portal, may also track such transfers, both in and out, in managing a form of subscription data exchange network, where one can actively track data transfers and, for example, suggest account reconciliations downstream or that a particular recipient increase their monthly allotment to address repetitive requests for data transfers. This may also be particularly convenient in the context of a working group or enterprise account to manage and oversee respective data usages and transfers between employees, colleagues, partners and the like. Likewise, families or groups of friends may also partake in data allotment sharing and transfers and track relative consumptions and transfers accordingly. In this case, grouped allocations may be less likely attributed to a resell model, but rather to a shared economy model or bulk purchase savings model whereby MB$ allotments are more readily distributed being an internetworked group.

In one embodiment, a referral compensation system may also be put into place to reward system subscribers upon successfully referring new subscribers to the iPCS network. For example, a subscriber wishing to promote iPCS subscription to one of its contacts can input this contact's mobile phone number to a referral engine that, as a result, sends a text invitation to this contact with direct option to subscribe to the iPCS network, which direct option may automatically link the new subscription back to the referrer. However, as the contact is likely to port their mobile number to the iPCS network when they subscribe to it, even if this new subscriber does not subscribe in direct response to the system's invitation, the referral may nonetheless be tracked to the original subscriber, who may be compensated accordingly. In one example, for each month of active subscription by each referred subscriber, the referrer may receive a predefined bonus data allotment to its account (e.g. 25 MB). Other referral techniques and compensation-based referral incentives may also be considered.

In yet other embodiments, the monetary aspects associated with the iPCS platform may be altogether reduced and replaced by an all-data currency (MB$) or the like, whereby service package purchases, exchanges and usages can all be tracked and traded using MB$ over money.

For example, MB$ may become a tradable commodity in that fluctuations in the value of MB$ may be expressed and absorbed within the underlying economics of the iPCS platform and whereby MB$ may be traded and exchanged for different potentially unrelated services based on current market values.

In one example, an international calling card market may be seamlessly integrated within the iPCS platform, whereby a user seeking to purchase a particular long distance card (e.g. based on a preferred call location or perceived call connection quality) can do so directly from the iPCS platform in exchange for a preset MB$ allotment, which may correspond to a reduced per-minute MB$ rate then would otherwise be applied without the card. To do so, users can browse through all the available major calling cards in the iPCS interface and simply select and purchase the card of their choice using MB$ and call right away. Since the cards are fully integrated into the iPCS platform, there is no need to dial access numbers or enter PINs to complete a call.

Other digital consumables may also, optionally, be acquired using MB$, as would possibly be available for purchase via the SoD interface, such as video-on-demand subscriptions and one-time rental fees, online gaming credits, upgrades, pay-per-use features/functions, etc.

With iPCS, the concept of pre-paid and post-paid customers and services has evolved. In one embodiment, customers purchase the MB$ as required. There are no monthly stops or resets and MB$ live on until consumed. Since MB$ can be purchased in various ways or transferred from user to user to user through the iPCS interface there are no longer any necessity to maintain large storefronts. Furthermore, customer service and support is delivered right through the iPCS interface.

In one embodiment, subscribers can receive online statements that look like and read like bank statements which show an opening balance at the beginning of the month and a closing balance at the end of the month and include all their transactions such as addition of MB$, transfer of MB$, long distance, purchase of a calling card or other on demand services, for example.

In other embodiments, the mobile operators can still invoice their clients and provide credit, similar to a post-paid service.

Telephony (Re)Routing for Virtualized SoIP Users

As noted above, the IPCS can also be used as a mobile phone enhancement for IPCS users who are also subscribed to another mobile service provider and may be locked into a long-term service contract or other commitment. Call numbers placed from an IPCS user from another service provider can be vetted through an iPCS database and, if the number is an IPCS user and online, the call is completed through IPCS.

For example, in one embodiment, the iPCS mobile operator system may be configured to implement a dipping process whereby a call can be routed through and terminated by an iPCS switch even when originating from and destined to non-iPCS subscribers. For instance, in one embodiment, the iPCS system may be configured to operate or interface with one or more call termination switches generally involved in the termination of regional, national and/or international calls originating from different carriers. Accordingly, calls routed through such iPCS-accessible switches can be rerouted, as appropriate, to a registered iPCS user's virtualized environment even when this user is subscribed to another native carrier, thereby taking full advantage of iPCS services and rate options.

For example, for inbound calls, where the iPCS system has access to one or more local call termination switches processing a significant volume of inbound calls originating from other local or international carriers (e.g. through various interconnection agreements), the termination number associated with such calls as they come into the iPCS-accessible switch can be cross checked with a database of IPCS users. If the terminating number is associated with an IPCS user, the switch can redirect the call for processing through the iPCS system rather than sending it to the native carrier with whom the number is registered. As a result, the call is completed via the iPCS data line and applicable user data usage rates, rather than using up the user's native carrier telephony minutes.

Figure 13:
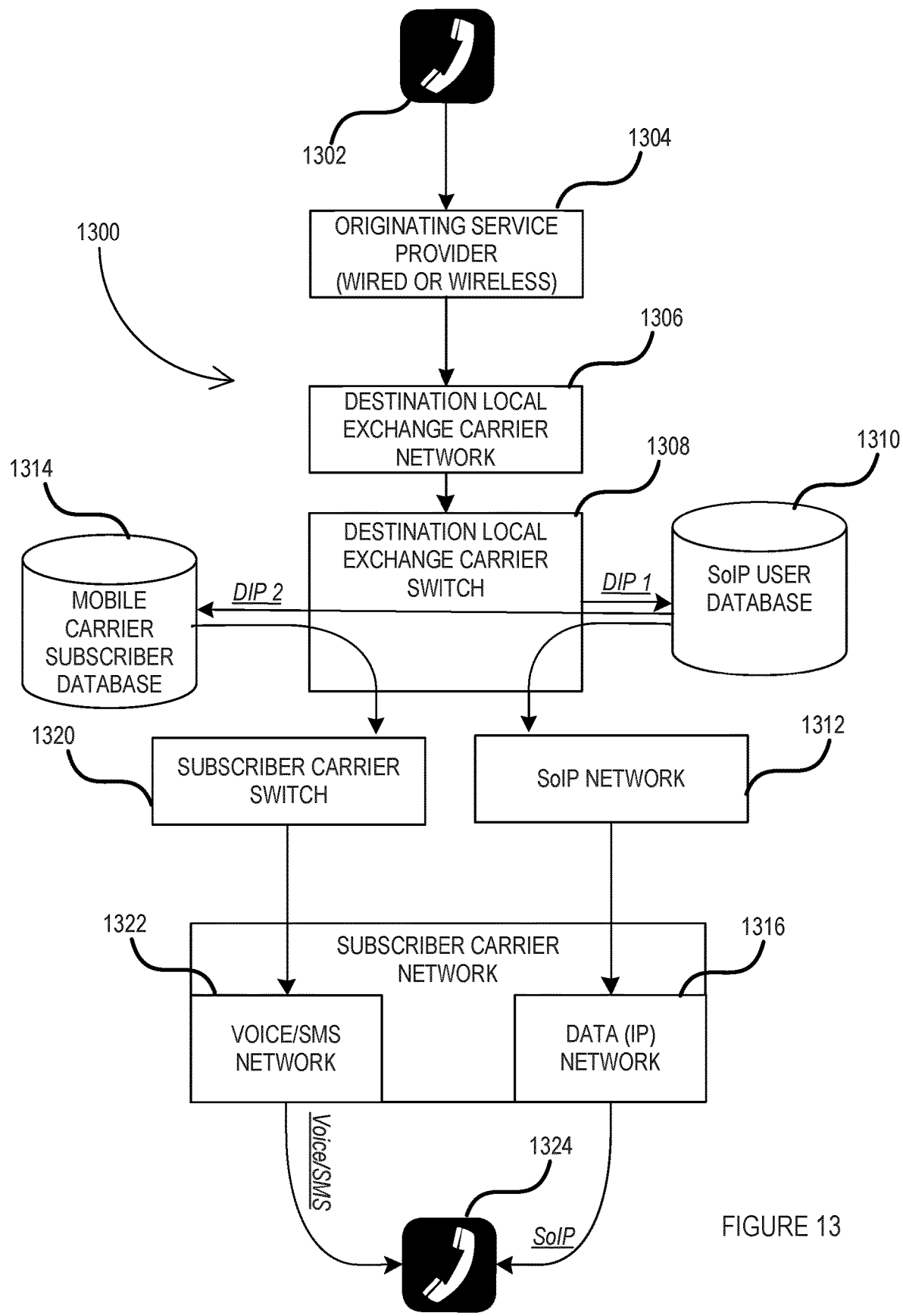
FIG. 13 is a flow diagram for inbound telephony with rerouting option to a virtualized smartphone-over-data environment.

With reference to FIG. 13, and in accordance with one embodiment, a flow diagram for inbound telephony with rerouting option to a destination user's virtualized smartphone-over-data (SoIP) environment will now be described in greater detail. In this example, an inbound call/SMS 1302 is initiated and directed to an originating wired or wireless service provider 1304. As noted above, the inbound call may be a local or international call and, in this example, is directed to a phone number associated with a mobile subscriber to a native mobile carrier that does not support a SoIP environment as discussed above, but where this subscriber is a registered user to another native carrier's SoIP environment (e.g. a SoIP carrier). Where the inbound call is routed directly via the subscriber's native carrier, the call is carried through over the subscriber's standard native carrier telephony voice/SMS network (e.g. GSM/UMTS/LTE/SMS). However, where the call/SMS is routed via the SoIP carrier's destination local exchange carrier network 1306 and switch 1308, or one administratively associated therewith, the SoIP carrier's switch 1308 may first dip into an internal SoIP user database to identify if the called number is associated with an SoIP user that is currently logged into their SoIP environment. If so, the switch 1308 may but need not dip into the mobile carrier subscriber database 1314 (generally available to all CLEC and ILECs, and used via standard SS7 dipping protocol to compile and provide access to up-to-date mobile subscriber carrier information and the like for call routing/termination) to identify the subscriber's native carrier, and rather automatically reroutes the call/SMS through the SoIP Network 1312. It is converted for transmission over IP and directed to the user's SoIP environment running on the user's device 1324 via the subscriber's native carrier data (IP) network 1316, or again via another available data connection, if not altogether running on another device. Otherwise, the switch 1308 dips into the mobile carrier subscriber database 1314 to identify the subscriber's native carrier and routes the call/SMS via standard voice/SMS protocols over the subscriber's native carrier voice/SMS telephony network 1322 to the user's device 1324.

Clearly, where the call/SMS originates from a caller's SoIP environment, the call/SMS will be automatically channeled through the SoIP network and, where the called party is also a user of the SoIP network, the call/SMS can be appropriately channeled over an IP network associated with the called number. Of course, all calls directed to a number registered with the SoIP carrier will terminate over IP to the called party's SoIP environment.

Likewise, for outbound long distance calls originating from an iPCS customer, the terminating number can be checked with the iPCS database. If the number corresponds with that of an iPCS user that is registered with another native carrier, it can be rerouted through the iPCS interface automatically, resulting in the recipient benefiting from his non-native iPCS service including cheaper talk time and long distance rates (i.e. data vs. telephony, etc.).

Further, this dipping process can also be used when an iPCS customer initiates a call outside his home country. All calls can be checked with the iPCS user database and, when the termination number is another iPCS customer, international roaming charges can be eliminated.

Naturally, non-native iPCS users also have the option to route long distance calls through the iPCS environment as opposed to using direct voice telephony over their native carrier network, thus benefiting from ice's competitive voice-over-data rates rather than to pay the higher voice minute rates applied by their native carrier. IPCS Text-over-data services may also be used to like effect.

Finally, IPCS users anywhere in the world may be able to take advantage of the system's international call resolution. When sending a text or placing a voice call, the IPCS server resolves the text or call and routes it to the most appropriate local service. As an example, a Rogers customer in Canada can place a call or text to an MTS subscriber in South Africa via IPCS, rather than incurring the Rogers long distance charge. The IPSC call resolution allows it to be treated as a local call or text. This is regardless of from where the Rogers client is calling.

Emergency and Location-Based Functions

The IPCS can also make a number of basic and enhanced emergency services available to its users, which make full use of Smartphone functionality. For example, Enhanced 911 (or e911) may come as a standard mandatory feature for all iPCS users. Due to the roaming nature of cell service, 911 calls using e911 are routed to an e911 emergency center, which obtains location information from the caller or in the case of iPCS, through the phone's GPS capability.

The iPCS may also be configured to support emergency direct communications, for example, by having the e911 function automatically activate the mobile device's speakerphone to relay a message in the case of an emergency. This can be used for example, to notify an iPCS user of an emergency situation such as a home break-in, an elderly parent in distress, etc. Emergency Direct Communication can work in tandem with other emergency services such as emergency bracelets, alarm companies, etc.

iPCS can also make full use of smartphone GPS functionality and provide users with a series of safety and convenience features. For example, e911 location services can be incorporated into the iPCS service to provide location data to the e911 service centre in the event of an emergency. For example, based on the phone's GPS coordinates, iPCS can resolve the nearest physical address and communicate this information to the e911 service centre as well as the mobile devices precise latitude and longitude.

Other GPS usages may also be contemplated. For example, a set of Convenience Service Buttons can provide for the user with easy assess to location-based services searches, such as via single button search access by major category such as food, gas, shopping and emergency services, for example.

While the present disclosure describes various exemplary embodiments, the disclosure is not so limited. To the contrary, the disclosure is intended to cover various modifications and equivalent arrangements included within the general scope of the present disclosure.

What is claimed is:

1. A method for maintaining a call between a calling device and a recipient device as the calling device migrates between distinct data networks, the method comprising:
receiving a call initialization request at a data server from an originating data network address on an originating data network accessible to the calling device, wherein said call initialization request comprises a call recipient identifier;
intermediating initialization of the call with the recipient device over a recipient network using said call recipient identifier to establish the call between the calling device and the recipient device;
relaying outbound voice communications from, and inbound voice communications to, said originating data network address over said originating data network once the call has been established;

receiving a new outbound communication initiated by the calling device from a new data network connection having a new data network address;

automatically associating said new data network address with the call; and relaying subsequent outbound voice communications from, and subsequent inbound voice communications to, said new data address to maintain the call without reinitializing the call connection with the calling device.

2. The method of claim 1, wherein said new outbound communication comprises a new outbound voice data communication; and wherein the method further comprises, before said associating, automatically identifying said new outbound voice data communication as originating from the calling device as part of the call established with the recipient device and extracting said new data network address therefrom for said automatic association.

3. The method of claim 1, wherein said new outbound communication is received over Real Time Protocol (RTP), and wherein said associating comprises defining said new data network address as an active RTP address for said subsequent inbound communications to the calling device.

4. The method of claim 1, wherein one of said originating data network address and said new data network address is a mobile data network IP address, whereas the other of said originating data network address and said new data network address is a fixed data network IP address.

5. The method of claim 4, wherein said fixed data network IP address is associated with a Wi-Fi access point.

6. The method of claim 1, further comprising establishing the call with the recipient device over any one of a mobile telephony network, a mobile data network, a fixed data network and a public switched telephone network.

7. The method of claim 1, wherein said initialization comprises initiating the call between the calling device and said server via Session Initiation Protocol (SIP) and Session Description Protocol (SDP), and wherein said outbound voice communications and said inbound voice communications are relayed between the calling device and said server via Real Time Protocol (RTP) over User Datagram Protocol (UDP).

8. The method of claim 1, wherein said call initialization request comprises an SIP Request, and wherein the method further comprises:

receiving a new SIP client registration request from the calling device originating from said new data network address; and automatically setting a SIP return path address to the calling device as said new data network address based on receipt of said new SIP client registration request.

9. The method of claim 2, wherein said call initialization request is generated by a client application operating on the calling device under a user profile registered with said data server; and wherein said automatically identifying comprises monitoring inbound data communications from said client application as associated with said user profile to automatically detect changes in said originating data network address.

10. The method of claim 9, wherein said client application is a cloud-based softphone application.

11. A method for maintaining a call between a calling device and a recipient device as the recipient device migrates between distinct data networks, the method comprising:

receiving a call initialization request at a data server from the calling device, wherein said call initialization request comprises a call recipient identifier;

intermediating initialization of the call with the recipient device over an originating recipient data network using said call recipient identifier to establish the call between the calling device and the recipient device;

relaying outbound voice communications from, and inbound voice communications to an originating data network address associated with the recipient device once the call has been established;

receiving a new outbound communication initiated by the recipient device from a new data network connection having a new data network address;

automatically associating said new data network address with the call; and relaying subsequent outbound voice communications from, and subsequent inbound voice communications to, said new data address to maintain the call without reinitializing a call connection with the recipient device.

12. The method of claim 11, wherein said new outbound communication comprises a new outbound voice data communication; and wherein the method further comprises, before said associating, automatically identifying said new outbound voice data communication as originating from the recipient device as part of the call established with the calling device and extracting said new data network address therefrom for said automatic association.

13. The method of claim 11, wherein said new outbound communication is received over Real Time Protocol (RTP), and wherein said associating comprises defining said new data network address as an active RTP address for said subsequent inbound communications to the recipient device.

14. A voice-over data call intermediation system comprising:

a network-accessible voice-over-data server operable to:
receive a call initialization request from an originating data network address on an originating data network accessible to a given calling device, wherein said call initialization request comprises a call recipient identifier;

intermediate initialization of a call with a recipient device over a recipient network using said call recipient identifier to establish a call between said calling device and said recipient device;

relay outbound voice communications from, and inbound voice communications to, said originating data network address over said originating data network once said call has been established;

automatically identify a new outbound communication initiated by said calling device from a new data network connection having a new data network address as originating from said calling device as part of said call established with said recipient device; and relay subsequent outbound voice communications from, and subsequent inbound voice communications to, said new data address to maintain said call without re-initializing a call connection with said calling device.

15. The system of claim 14, further comprising a client application operating on said calling device and operable to send said call initialization request to said data server to establish and maintain said call via said client application.

16. The system of claim 15, wherein said client application consists of a thin client application executed on a mobile device and configured to relay all data communications from said mobile device to said network-accessible voice-over-data server, or another server operatively associated therewith, irrespective of a data network connection type selected by said mobile device.

17. The system of claim 16, wherein said mobile device is configured to automatically switch to an available Wi-Fi data network connection from an ongoing mobile data connection, wherein said call is substantially seamlessly and uninterruptedly migrated to said Wi-Fi data network connection upon said switch.

18. The system of claim 15, wherein said client application is only operable subsequent to server authentication such that all data communications relayed from and to said calling device in respect of said client application are relayed under a user profile associated with said server authentication.

19. The system of claim 15, wherein said client application is a cloud-based softphone application.

20. The system of claim 14, wherein one of said originating data network address and said new data network address is a mobile data network IP address, whereas the other of said originating data network address and said new data network address is a fixed data network IP address.

* * * * *